United States Patent
Rieger et al.

(10) Patent No.: US 9,519,728 B2
(45) Date of Patent: Dec. 13, 2016

(54) APPARATUS AND METHODS FOR MONITORING AND OPTIMIZING DELIVERY OF CONTENT IN A NETWORK

(75) Inventors: Remi Rieger, Charlotte, NC (US); Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 1997 days.

(21) Appl. No.: 12/631,713

(22) Filed: Dec. 4, 2009

(65) Prior Publication Data

US 2011/0138064 A1    Jun. 9, 2011

(51) Int. Cl.
G06F 15/16    (2006.01)
G06F 17/30    (2006.01)

(52) U.S. Cl.
CPC .............................. G06F 17/30905 (2013.01)

(58) Field of Classification Search
CPC . H04N 21/43615; H04N 21/472; H04W 4/02; H04L 51/14; H04L 67/148; H04L 69/24
USPC ........................................ 709/203, 217, 228
See application file for complete search history.

(56) References Cited

U.S. PATENT DOCUMENTS

| | | |
|---|---|---|
| 5,410,344 A | 4/1995 | Graves et al. |
| 5,528,284 A | 6/1996 | Iwami et al. |
| 5,534,911 A | 7/1996 | Levitan |
| 5,557,319 A | 9/1996 | Gurusami et al. |
| 5,628,284 A | 5/1997 | Sheen et al. |
| 5,708,961 A | 1/1998 | Hylton et al. |
| 5,745,837 A | 4/1998 | Fuhrmann |

(Continued)

FOREIGN PATENT DOCUMENTS

| | | |
|---|---|---|
| JP | 2001275090 A | 10/2001 |
| JP | 2005519365 A | 6/2005 |

(Continued)

OTHER PUBLICATIONS

Cantor, et al., Bindings for the Oasis Security Assertion Markup Language (SAML) V2.0, Oasis Standard, Mar. 2005 (http://docs.oasis-open.org/security/saml/v2.0/).

(Continued)

*Primary Examiner* — Kristie Shingles
(74) *Attorney, Agent, or Firm* — Gazdzinski & Associates, PC

(57) ABSTRACT

Methods and apparatus for delivering content to a user so as to optimize and enhance the "experience" of the content. In one embodiment, an optimization and monitoring entity (OME) is used which determines, evaluates, and provides notification and/or recommendation of alternative content delivery platforms which are available to a user. The OME receives requests for content forwarded from a content server containing information identifying requesting devices and/or subscriber accounts. The OME examines the capabilities of the registered devices, and identifies/recommends alternative devices based on e.g., video/audio quality, picture size, bandwidth availability, and/or any other additional capabilities of the client devices. A notification is then sent to the client devices indicating which of the user's devices may receive the content alternatively, or in addition to, the requesting device. The notifications may be interactive, allowing the user to select one or more of the devices for delivery.

46 Claims, 16 Drawing Sheets

(56) References Cited

U.S. PATENT DOCUMENTS

| | | |
|---|---|---|
| 5,758,257 A | 5/1998 | Herz et al. |
| 5,818,438 A | 10/1998 | Howe et al. |
| 5,822,530 A | 10/1998 | Brown |
| 5,838,921 A | 11/1998 | Speeter |
| 5,897,635 A | 4/1999 | Torres et al. |
| 5,940,738 A | 8/1999 | Rao |
| 5,999,535 A | 12/1999 | Wang et al. |
| 6,125,397 A | 9/2000 | Yoshimura et al. |
| 6,167,432 A | 12/2000 | Jiang |
| 6,181,697 B1 | 1/2001 | Nurenberg et al. |
| 6,219,710 B1 | 4/2001 | Gray et al. |
| 6,233,389 B1 | 5/2001 | Barton et al. |
| 6,259,701 B1 | 7/2001 | Shur et al. |
| 6,317,884 B1 | 11/2001 | Eames et al. |
| 6,345,038 B1 | 2/2002 | Selinger |
| 6,389,538 B1 | 5/2002 | Gruse et al. |
| 6,396,531 B1 | 5/2002 | Gerszberg et al. |
| 6,473,793 B1 | 10/2002 | Dillon et al. |
| 6,519,062 B1 | 2/2003 | Yoo |
| 6,523,696 B1 | 2/2003 | Saito et al. |
| 6,546,016 B1 | 4/2003 | Gerszberg et al. |
| 6,564,381 B1 | 5/2003 | Hodge et al. |
| 6,640,145 B2 | 10/2003 | Hoffberg et al. |
| 6,642,938 B1 | 11/2003 | Gilboy |
| 6,642,939 B1 | 11/2003 | Vallone et al. |
| 6,643,262 B1 | 11/2003 | Larsson et al. |
| 6,694,145 B2 | 2/2004 | Riikonen et al. |
| 6,711,742 B1 | 3/2004 | Kishi et al. |
| 6,718,552 B1 | 4/2004 | Goode |
| 6,748,395 B1 | 6/2004 | Picker et al. |
| 6,754,904 B1 | 6/2004 | Cooper et al. |
| 6,757,906 B1 | 6/2004 | Look et al. |
| 6,774,926 B1 | 8/2004 | Ellis et al. |
| 6,788,676 B2 | 9/2004 | Partanen et al. |
| 6,847,778 B1 | 1/2005 | Vallone et al. |
| 6,865,746 B1 | 3/2005 | Herrington et al. |
| 6,909,726 B1 | 6/2005 | Sheeran |
| 6,918,131 B1 | 7/2005 | Rautila et al. |
| 6,925,257 B2 | 8/2005 | Yoo |
| 6,931,018 B1 | 8/2005 | Fisher |
| 6,934,964 B1 | 8/2005 | Schaffer et al. |
| 6,944,150 B1 | 9/2005 | McConnell et al. |
| 6,978,474 B1 | 12/2005 | Sheppard et al. |
| 7,003,670 B2 | 2/2006 | Heaven et al. |
| 7,006,881 B1 | 2/2006 | Hoffberg et al. |
| 7,009,972 B2 | 3/2006 | Maher et al. |
| 7,013,290 B2 | 3/2006 | Ananian |
| 7,020,652 B2 | 3/2006 | Matz et al. |
| 7,027,460 B2 | 4/2006 | Iyer et al. |
| 7,039,048 B1 | 5/2006 | Monta et al. |
| 7,051,352 B1 | 5/2006 | Schaffer |
| 7,054,902 B2 | 5/2006 | Toporek et al. |
| 7,055,031 B2 | 5/2006 | Platt |
| 7,055,165 B2 | 5/2006 | Connelly |
| 7,068,639 B1 | 6/2006 | Varma et al. |
| 7,096,483 B2 | 8/2006 | Johnson |
| 7,099,308 B2 | 8/2006 | Merrill et al. |
| 7,100,183 B2 | 8/2006 | Kunkel et al. |
| 7,103,905 B2 | 9/2006 | Novak |
| 7,106,382 B2 | 9/2006 | Shiotsu |
| 7,146,627 B1 | 12/2006 | Ismail et al. |
| 7,149,772 B1 | 12/2006 | Kalavade |
| 7,167,895 B1 | 1/2007 | Connelly |
| 7,174,126 B2 | 2/2007 | McElhatten et al. |
| 7,174,127 B2 | 2/2007 | Otten et al. |
| 7,174,385 B2 | 2/2007 | Li |
| 7,185,355 B1 | 2/2007 | Ellis et al. |
| 7,206,775 B2 | 4/2007 | Kaiser et al. |
| 7,207,055 B1 | 4/2007 | Hendricks et al. |
| 7,209,458 B2 | 4/2007 | Ahvonen et al. |
| 7,213,036 B2 | 5/2007 | Apparao et |
| 7,228,556 B2 | 6/2007 | Beach et al. |
| 7,242,960 B2 | 7/2007 | van Rooyen |
| 7,242,988 B1 | 7/2007 | Hoffberg et al. |
| 7,254,608 B2 | 8/2007 | Yeager et al. |
| 7,257,106 B2 | 8/2007 | Chen et al. |
| 7,260,823 B2 | 8/2007 | Schlack et al. |
| 7,293,276 B2 | 11/2007 | Phillips et al. |
| 7,312,391 B2 | 12/2007 | Kaiser et al. |
| 7,325,043 B1 | 1/2008 | Rosenberg et al. |
| 7,325,073 B2 | 1/2008 | Shao et al. |
| 7,330,483 B1 | 2/2008 | Peters, Jr. et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,762 B2 | 3/2008 | Kim |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,382,786 B2 | 6/2008 | Chen et al. |
| 7,444,655 B2 | 10/2008 | Sardera |
| 7,457,520 B2 | 11/2008 | Rossetti et al. |
| 7,486,869 B2 | 2/2009 | Alexander et al. |
| 7,487,523 B1 | 2/2009 | Hendricks |
| 7,532,712 B2 | 5/2009 | Gonder et al. |
| 7,548,562 B2 | 6/2009 | Ward et al. |
| 7,567,983 B2 | 7/2009 | Pickelsimer |
| 7,571,452 B2 | 8/2009 | Gutta |
| 7,592,912 B2 | 9/2009 | Hasek et al. |
| 7,602,820 B2 | 10/2009 | Helms et al. |
| 7,609,637 B2 | 10/2009 | Doshi et al. |
| 7,624,337 B2 | 11/2009 | Sull et al. |
| 7,650,319 B2 | 1/2010 | Hoffberg et al. |
| 7,690,020 B2 | 3/2010 | Lebar |
| 7,693,171 B2 | 4/2010 | Gould |
| 7,721,314 B2 | 5/2010 | Sincaglia et al. |
| 7,725,553 B2* | 5/2010 | Rang et al. ............ H04L 51/04 709/204 |
| 7,742,074 B2 | 6/2010 | Minatogawa |
| 7,770,200 B2 | 8/2010 | Brooks et al. |
| 7,809,942 B2 | 10/2010 | Baran et al. |
| 7,893,171 B2 | 2/2011 | Le et al. |
| 7,900,052 B2 | 3/2011 | Jonas |
| 7,908,626 B2 | 3/2011 | Williamson et al. |
| 7,916,755 B2 | 3/2011 | Hasek et al. |
| 7,936,775 B2 | 5/2011 | Iwamura |
| 7,954,131 B2 | 5/2011 | Cholas et al. |
| 8,042,054 B2* | 10/2011 | White et al. .................. 715/762 |
| 8,095,610 B2* | 1/2012 | Gould et al. .................. 709/207 |
| 8,166,126 B2* | 4/2012 | Bristow et al. ..... H04L 12/5855 370/335 |
| 8,170,065 B2 | 5/2012 | Hasek et al. |
| 8,219,134 B2* | 7/2012 | Maharajh et al. ............ 455/519 |
| 8,249,497 B2 | 8/2012 | Ingrassia et al. |
| 8,281,352 B2 | 10/2012 | Brooks et al. |
| 8,347,341 B2 | 1/2013 | Markley et al. |
| 8,429,702 B2 | 4/2013 | Yasrebi et al. |
| 8,484,511 B2 | 7/2013 | Tidwell et al. |
| 8,516,529 B2 | 8/2013 | Lajoie et al. |
| 8,520,850 B2* | 8/2013 | Helms et al. ................. 380/239 |
| 8,738,607 B2 | 5/2014 | Dettinger et al. |
| 8,750,490 B2* | 6/2014 | Murtagh et al. .... H04M 7/0012 379/211.02 |
| 8,750,909 B2* | 6/2014 | Fan et al. ............ H04L 65/1006 455/414.3 |
| 8,805,270 B2* | 8/2014 | Maharajh et al. ............ 455/3.01 |
| 8,949,919 B2 | 2/2015 | Cholas et al. |
| 8,995,815 B2* | 3/2015 | Maharajh et al. ............ 386/205 |
| 9,124,608 B2* | 9/2015 | Jin et al. ............ H04L 65/1093 |
| 9,124,650 B2* | 9/2015 | Maharajh et al. |
| 9,215,423 B2 | 12/2015 | Kimble et al. |
| 2001/0004768 A1 | 6/2001 | Hodge et al. |
| 2001/0050945 A1 | 12/2001 | Lindsey |
| 2002/0002688 A1 | 1/2002 | Gregg et al. |
| 2002/0024943 A1 | 2/2002 | Karaul et al. |
| 2002/0027883 A1 | 3/2002 | Belaiche |
| 2002/0032754 A1 | 3/2002 | Logston et al. |
| 2002/0042921 A1 | 4/2002 | Ellis |
| 2002/0053076 A1 | 5/2002 | Landesmann |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0083451 A1 | 6/2002 | Gill et al. |

(56) References Cited

U.S. PATENT DOCUMENTS

| | | |
|---|---|---|
| 2002/0087995 A1 | 7/2002 | Pedlow, Jr. |
| 2002/0123931 A1 | 9/2002 | Splaver et al. |
| 2002/0144267 A1 | 10/2002 | Gutta et al. |
| 2002/0147771 A1 | 10/2002 | Traversat et al. |
| 2002/0152091 A1 | 10/2002 | Nagaoka et al. |
| 2002/0152299 A1 | 10/2002 | Traversat et al. |
| 2002/0178444 A1 | 11/2002 | Trajkovic et al. |
| 2002/0188744 A1 | 12/2002 | Mani |
| 2002/0188869 A1 | 12/2002 | Patrick |
| 2002/0194595 A1 | 12/2002 | Miller et al. |
| 2003/0005453 A1 | 1/2003 | Rodriguez et al. |
| 2003/0028451 A1 | 2/2003 | Ananian |
| 2003/0056217 A1 | 3/2003 | Brooks |
| 2003/0093794 A1 | 5/2003 | Thomas et al. |
| 2003/0097574 A1 | 5/2003 | Upton |
| 2003/0115267 A1 | 6/2003 | Hinton et al. |
| 2003/0135628 A1 | 7/2003 | Fletcher et al. |
| 2003/0163443 A1 | 8/2003 | Wang |
| 2003/0165241 A1 | 9/2003 | Fransdonk |
| 2003/0166401 A1 | 9/2003 | Combes et al. |
| 2003/0200548 A1 | 10/2003 | Baran et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2004/0034677 A1 | 2/2004 | Davey et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0117254 A1 | 6/2004 | Nemirofsky et al. |
| 2004/0133923 A1 | 7/2004 | Watson et al. |
| 2004/0137918 A1 | 7/2004 | Varonen et al. |
| 2004/0166832 A1 | 8/2004 | Portman et al. |
| 2004/0230994 A1 | 11/2004 | Urdang et al. |
| 2004/0250273 A1 | 12/2004 | Swix et al. |
| 2005/0034171 A1 | 2/2005 | Benya |
| 2005/0049886 A1 | 3/2005 | Grannan et al. |
| 2005/0055220 A1 | 3/2005 | Lee et al. |
| 2005/0055729 A1 | 3/2005 | Atad et al. |
| 2005/0086334 A1 | 4/2005 | Aaltonen et al. |
| 2005/0086683 A1 | 4/2005 | Meyerson |
| 2005/0108763 A1 | 5/2005 | Baran et al. |
| 2005/0114701 A1 | 5/2005 | Atkins et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0223097 A1* | 10/2005 | Ramsayer et al. ...... H04L 29/06 709/227 |
| 2005/0228725 A1 | 10/2005 | Rao et al. |
| 2005/0289616 A1 | 12/2005 | Horiuchi et al. |
| 2005/0289618 A1 | 12/2005 | Hardin |
| 2006/0020786 A1 | 1/2006 | Helms et al. |
| 2006/0021004 A1 | 1/2006 | Moran et al. |
| 2006/0021019 A1 | 1/2006 | Hinton et al. |
| 2006/0041905 A1 | 2/2006 | Wasilewski |
| 2006/0041915 A1 | 2/2006 | Dimitrova et al. |
| 2006/0047957 A1 | 3/2006 | Helms et al. |
| 2006/0053463 A1 | 3/2006 | Choi |
| 2006/0095940 A1 | 5/2006 | Yearwood |
| 2006/0117379 A1 | 6/2006 | Bennett et al. |
| 2006/0130099 A1 | 6/2006 | Rooyen |
| 2006/0130101 A1 | 6/2006 | Wessel van Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0136968 A1 | 6/2006 | Han et al. |
| 2006/0149850 A1 | 7/2006 | Bowman |
| 2006/0156392 A1 | 7/2006 | Baugher |
| 2006/0161635 A1 | 7/2006 | Lamkin et al. |
| 2006/0171423 A1 | 8/2006 | Helms et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218604 A1 | 9/2006 | Riedl et al. |
| 2006/0221246 A1 | 10/2006 | Yoo |
| 2006/0238656 A1 | 10/2006 | Chen et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0025372 A1 | 2/2007 | Brenes et al. |
| 2007/0033531 A1 | 2/2007 | Marsh |
| 2007/0049245 A1 | 3/2007 | Lipman |
| 2007/0053513 A1 | 3/2007 | Hoffberg |
| 2007/0061023 A1 | 3/2007 | Hoffberg et al. |
| 2007/0067851 A1 | 3/2007 | Fernando et al. |
| 2007/0073704 A1 | 3/2007 | Bowden et al. |
| 2007/0076728 A1 | 4/2007 | Rieger et al. |
| 2007/0081537 A1 | 4/2007 | Wheelock |
| 2007/0094691 A1 | 4/2007 | Gazdzinski |
| 2007/0118848 A1 | 5/2007 | Schwesinger et al. |
| 2007/0121578 A1 | 5/2007 | Annadata et al. |
| 2007/0121678 A1 | 5/2007 | Brooks et al. |
| 2007/0124488 A1 | 5/2007 | Baum et al. |
| 2007/0153820 A1 | 7/2007 | Gould |
| 2007/0154041 A1 | 7/2007 | Beauchamp |
| 2007/0157234 A1 | 7/2007 | Walker |
| 2007/0157262 A1 | 7/2007 | Ramaswamy et al. |
| 2007/0180230 A1 | 8/2007 | Cortez |
| 2007/0204300 A1 | 8/2007 | Markley et al. |
| 2007/0204314 A1 | 8/2007 | Hasek et al. |
| 2007/0209054 A1 | 9/2007 | Cassanova |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0226365 A1 | 9/2007 | Hildreth et al. |
| 2007/0245376 A1 | 10/2007 | Svendsen |
| 2007/0250880 A1 | 10/2007 | Hainline |
| 2007/0261116 A1 | 11/2007 | Prafullchandra et al. |
| 2007/0276925 A1 | 11/2007 | La Joie et al. |
| 2007/0276926 A1 | 11/2007 | LaJoie et al. |
| 2007/0280298 A1 | 12/2007 | Hearn et al. |
| 2007/0288637 A1 | 12/2007 | Layton et al. |
| 2007/0288715 A1 | 12/2007 | Boswell et al. |
| 2007/0294717 A1 | 12/2007 | Hill et al. |
| 2007/0294738 A1 | 12/2007 | Kuo et al. |
| 2007/0299728 A1 | 12/2007 | Nemirofsky et al. |
| 2008/0021836 A1 | 1/2008 | Lao |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092181 A1 | 4/2008 | Britt |
| 2008/0098212 A1* | 4/2008 | Helms et al. ............... 713/155 |
| 2008/0098450 A1 | 4/2008 | Wu et al. |
| 2008/0112405 A1 | 5/2008 | Cholas et al. |
| 2008/0133551 A1 | 6/2008 | Wensley et al. |
| 2008/0137541 A1 | 6/2008 | Agarwal et al. |
| 2008/0155059 A1 | 6/2008 | Hardin et al. |
| 2008/0162353 A1 | 7/2008 | Tom et al. |
| 2008/0170551 A1 | 7/2008 | Zaks |
| 2008/0177998 A1* | 7/2008 | Apsangi et al. ............ 713/155 |
| 2008/0192820 A1 | 8/2008 | Brooks et al. |
| 2008/0201386 A1 | 8/2008 | Maharajh et al. |
| 2008/0201748 A1 | 8/2008 | Hasek et al. |
| 2008/0222684 A1 | 9/2008 | Mukraj et al. |
| 2008/0235746 A1 | 9/2008 | Peters et al. |
| 2008/0273591 A1 | 11/2008 | Brooks et al. |
| 2008/0279534 A1 | 11/2008 | Buttars |
| 2008/0281971 A1* | 11/2008 | Leppanen et al. .. H04L 12/1818 709/228 |
| 2008/0282299 A1 | 11/2008 | Koat et al. |
| 2008/0297669 A1 | 12/2008 | Zalewski et al. |
| 2008/0306903 A1 | 12/2008 | Larson et al. |
| 2008/0320523 A1 | 12/2008 | Morris et al. |
| 2009/0030802 A1 | 1/2009 | Plotnick et al. |
| 2009/0031335 A1 | 1/2009 | Hendricks et al. |

(56) References Cited

U.S. PATENT DOCUMENTS

| | | |
|---|---|---|
| 2009/0064221 A1 | 3/2009 | Stevens |
| 2009/0083279 A1 | 3/2009 | Hasek |
| 2009/0083813 A1 | 3/2009 | Dolce et al. |
| 2009/0086643 A1 | 4/2009 | Kotrla et al. |
| 2009/0098861 A1 | 4/2009 | Kalliola et al. |
| 2009/0100459 A1 | 4/2009 | Riedl et al. |
| 2009/0100493 A1 | 4/2009 | Jones et al. |
| 2009/0133048 A1 | 5/2009 | Gibbs et al. |
| 2009/0141696 A1 | 6/2009 | Chou et al. |
| 2009/0150917 A1 | 6/2009 | Huffman et al. |
| 2009/0151006 A1* | 6/2009 | Saeki et al. ............ G06F 21/10 726/28 |
| 2009/0158311 A1 | 6/2009 | Hon et al. |
| 2009/0172776 A1 | 7/2009 | Makagon et al. |
| 2009/0175218 A1 | 7/2009 | Song et al. |
| 2009/0185576 A1 | 7/2009 | Kisel et al. |
| 2009/0187939 A1 | 7/2009 | Lajoie |
| 2009/0193486 A1 | 7/2009 | Patel et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0235308 A1 | 9/2009 | Ehlers et al. |
| 2009/0282241 A1* | 11/2009 | Prafullchandra et al. .... 713/156 |
| 2009/0282449 A1 | 11/2009 | Lee |
| 2009/0293101 A1 | 11/2009 | Carter et al. |
| 2009/0296621 A1 | 12/2009 | Park et al. |
| 2010/0012568 A1 | 1/2010 | Fujisawa et al. |
| 2010/0027560 A1 | 2/2010 | Yang et al. |
| 2010/0030578 A1 | 2/2010 | Siddique et al. |
| 2010/0031299 A1* | 2/2010 | Harrang et al. ................ 725/80 |
| 2010/0042478 A1 | 2/2010 | Reisman |
| 2010/0043030 A1 | 2/2010 | White |
| 2010/0083329 A1 | 4/2010 | Joyce et al. |
| 2010/0083362 A1 | 4/2010 | Francisco |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0122274 A1 | 5/2010 | Gillies et al. |
| 2010/0122276 A1 | 5/2010 | Chen |
| 2010/0125658 A1 | 5/2010 | Strasters |
| 2010/0131973 A1 | 5/2010 | Dillon et al. |
| 2010/0138900 A1 | 6/2010 | Peterka et al. |
| 2010/0169977 A1 | 7/2010 | Dasher et al. |
| 2010/0199299 A1 | 8/2010 | Chang et al. |
| 2010/0199312 A1 | 8/2010 | Chang et al. |
| 2010/0217613 A1 | 8/2010 | Kelly |
| 2010/0218231 A1 | 8/2010 | Frink et al. |
| 2010/0219613 A1 | 9/2010 | Zaloom et al. |
| 2010/0251304 A1 | 9/2010 | Donoghue et al. |
| 2010/0251305 A1 | 9/2010 | Kimble et al. |
| 2010/0269144 A1 | 10/2010 | Forsman et al. |
| 2010/0280641 A1 | 11/2010 | Harkness et al. |
| 2010/0287609 A1 | 11/2010 | Gonzalez et al. |
| 2010/0313225 A1 | 12/2010 | Cholas et al. |
| 2010/0325547 A1 | 12/2010 | Keng et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0071841 A1 | 3/2011 | Fomenko et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0107379 A1* | 5/2011 | Lajoie et al. .................. 725/87 |
| 2011/0110515 A1 | 5/2011 | Tidwell et al. |
| 2011/0126018 A1 | 5/2011 | Narsinh et al. |
| 2011/0145049 A1 | 6/2011 | Hertel et al. |
| 2011/0173053 A1 | 7/2011 | Aaltonen et al. |
| 2011/0173095 A1 | 7/2011 | Kassaei et al. |
| 2011/0178943 A1 | 7/2011 | Motahari et al. |
| 2011/0191801 A1 | 8/2011 | Vytheeswaran |
| 2011/0213688 A1 | 9/2011 | Santos et al. |
| 2011/0219229 A1 | 9/2011 | Cholas et al. |
| 2011/0265116 A1 | 10/2011 | Stern et al. |
| 2011/0276881 A1 | 11/2011 | Keng et al. |
| 2012/0005527 A1 | 1/2012 | Engel et al. |
| 2012/0008786 A1 | 1/2012 | Cronk et al. |
| 2012/0011567 A1 | 1/2012 | Cronk et al. |
| 2012/0023535 A1 | 1/2012 | Brooks |
| 2012/0030363 A1 | 2/2012 | Conrad |
| 2012/0124606 A1 | 5/2012 | Tidwell et al. |
| 2012/0144416 A1 | 6/2012 | Wetzer et al. |
| 2012/0185899 A1 | 7/2012 | Riedl et al. |
| 2013/0014140 A1 | 1/2013 | Ye et al. |
| 2013/0014171 A1 | 1/2013 | Sansom et al. |
| 2013/0024888 A1 | 1/2013 | Sivertsen |
| 2013/0046849 A1 | 2/2013 | Wolf et al. |
| 2013/0097647 A1 | 4/2013 | Brooks et al. |
| 2013/0117692 A1 | 5/2013 | Padmanabhan et al. |
| 2014/0074855 A1 | 3/2014 | Zhao et al. |
| 2015/0040176 A1 | 2/2015 | Hybertson et al. |
| 2015/0095932 A1 | 4/2015 | Ren |

FOREIGN PATENT DOCUMENTS

| | | |
|---|---|---|
| JP | 2005519501 A | 6/2005 |
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO 01/10125 | 2/2001 |
| WO | WO-0110125 A1 | 2/2001 |
| WO | WO-2005015422 A1 | 2/2005 |
| WO | WO-2005031524 A2 | 4/2005 |
| WO | WO-2007060451 A2 | 5/2007 |
| WO | WO-2012021245 A1 | 2/2012 |
| WO | WO-2012114140 A1 | 8/2012 |

OTHER PUBLICATIONS

DLNA (Digital Living Network Alliance) protocols described in DLNA Networked Device Interoperability Guidelines Expanded, Mar. 2006 and subsequent expanded version dated Oct. 2006.

Enhanced TV Binary Interchange, Format 1.0 OC-SP-ETV-BIF1.0-I04-070921 Date: Sep. 21, 2007, 420 pages.

Select a Channel to start watching, Videophiles: Curate your own online video channel with expressive, easy to use tools; © 2014 Redux, Inc. All rights reserved; http://www.redux.com/; 2 pages.

Siebenlist F., et al., "Global Grid Forum Specification Roadmap towards a Secure OGSA," Jul. 2002, pp. 1-22.

UTF-32, IBM, retrieved from http://publib.boulder.ibm.com/infocenter/iseries/v5r3/index.jsp?topic=%2Fnls%2Frbagstuff32.htm. on Aug. 28, 2013.

* cited by examiner

APPARATUS AND METHODS FOR MONITORING AND OPTIMIZING DELIVERY OF CONTENT IN A NETWORK

RELATED APPLICATIONS

This application is related to co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK", and 61/256,903 filed on Oct. 30, 2009 and entitled "METHODS AND APPARATUS FOR PACKETIZED CONTENT DELIVERY OVER A CONTENT DELIVERY NETWORK", which is now filed as U.S. patent application Ser. No. 12/764,746, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of optimizing the operation of a content delivery network such as for example a cable, Hybrid Fiber Copper (HFCu), or satellite network. More particularly, the present invention is in one exemplary aspect related to apparatus and methods for monitoring and optimizing delivery of programs including across a plurality of delivery platforms.

2. Description of Related Technology

Recent advances in digital information processing and technology have made a whole range of services and functions available for delivery to consumers at various types devices for very reasonable prices or subscription fees. These services and functions include digital content or programming (movies, etc.), digital video-on-demand (VOD), personal video recorder (PVR) and networked PVR (nPVR), Internet Protocol television (IPTV), digital media playback and recording, as well high speed Internet access (including so-called "Internet TV", where television programming is delivered over the Internet without QoS) and IP-based telephony (e.g., VoIP). Other services available to network users include access to, and recording of, digital music (e.g., MP3 files).

Currently, many of these services are provided to the user via a wide variety of different equipment environments and delivery paradigms including, inter alia, cable or satellite modems or QAMs, HFCu (i.e., Hybrid Fiber-copper distribution via indigenous POST/PSTN wiring in a premises), Wi-Fi™ hubs, Ethernet hubs, gateways, switches, and routers, to a plurality of user equipment types. For example, content may be delivered to users at set-top boxes, personal (desktop) computers, laptop computers, other mini-computers (such as so-called "netbooks", mini-notebook computers), and/or other devices. Recent advances in consumer electronics have also led to the widespread introduction of a variety of portable media devices (PMDs) such as, inter alia, portable digital music devices such as the well known Apple iPod™ and other so-called "MP3 players", cellular telephones/smartphones, handheld computers, and personal digital assistants (PDA), which allow users to store and playback audio and video files.

Although a myriad of services, equipment, data formats and providers are available, current systems offer little to no interoperability or "intelligent" interrelationship between devices. The request for and playback of audio and video files from a first device is often limited to playback via the device itself. In other words, a user may utilize a device to only select delivery of audio and video files to be played back on that same device. Thus, if a user requests video content, the user is often limited to delivery of the requested content to that device. Further, the request messages are frequently determined by a specific protocol tied to the device or software that maybe incompatible with other device and software protocols thereby creating incompatibility issues. Current technology allows one device to browse the directory structure of other compatible devices (see, e.g., DLNA technology); however, there is no real intelligence or over-arching cognizance of the relationship of all of the devices associated with a given user or subscriber account, and their relationship to different types of content available over the various networks or delivery paradigms.

Nor is their any analysis of what devices or combinations of devices, encodings, etc. would give the user the best "experience" with respect to given content, including consideration of user-specific preferences. Rather, extant solutions are generally completely passive, and take no active role in evaluating, recommending, or selecting content formats, delivery modes or user platforms and translating multiprotocol message requests.

Therefore, what are needed are improved apparatus and methods for distributing content to a plurality of a user premises and PMD devices. Such improved apparatus and services would ideally, upon user request for content, provide users with recommendations for optimizing the user's experience and/or the network workload. For example, mechanisms would be provided to exploit the various features of the different ones of the user's available devices, as well as that user's delivery preferences.

Moreover, it would be desirable to permit the user to view their content anywhere (and on any device) they desire, at any given time, including the ability to transfer extant content "sessions" between different devices, the latter which may include heterogeneous hardware/software environments.

SUMMARY OF THE INVENTION

The present invention satisfies the foregoing needs by providing, inter alia, improved apparatus and methods for optimization and monitoring of content delivery, including monitoring and optimizing content delivery across a plurality of delivery platforms associated with a single user or premises.

In a first aspect of the invention, a method for providing content is disclosed. In one embodiment, the content delivery network comprises at least one content server, a protocol translation server, a database, and a plurality of client devices, and the method comprises: receiving a request for content from one of the plurality of client devices; determining a subscriber account to which the one client device issuing the request has been registered; identifying at least one other device in the database also registered to the subscriber account; and causing generation of a notification for display on the one requesting client device, the notification showing or listing the at least one other device.

In one variant, the identifying at least one other device comprises identifying the at least one other device based on its ability to suitably render the requested content.

In another variant, the identifying at least one other device comprises identifying the at least one other device based on its ability to suitably render the requested content better than the one client device.

In a further variant, the identifying at least one other device comprises identifying the at least one other device based on its current availability for display of the requested content. The identifying at least one other device comprises further identifying the at least one other device based on its ability to render the requested content better than the one client device.

In another variant, the protocol translation server accepts message from the client in the client native messaging protocol and translate the messaging to other protocols to bridge messaging between other clients, servers or other equipment in the delivery of content.

In another variant, if the determining indicates that the one requesting client device is not registered to a subscriber account, registering the client device to a subscriber account. The registration comprises e.g., receiving information identifying the client device and the subscriber account; associating the client device to the subscriber account; and storing the association in the database. The information identifying the client device comprises at least one of a MAC address and/or an IP address, and the information identifying the subscriber account comprises at least one of an account number and a login-password combination.

In yet another variant, the act of determining comprises utilizing a cryptographic hash of a piece of information uniquely identifying the one requesting client device, and matching this to a corresponding hash within the database.

In still another variant, the notification is further configured to enable a user of the requesting client device to select one or more of the at least one other devices for delivery of content thereto.

In yet another variant, the method further comprises: generating a graphical display having representations of at least the one client device and the at least one other device; and allowing the user to select at least one of the devices via the display.

In a second aspect of the invention, apparatus for use in a content delivery network is disclosed. In one embodiment, the apparatus comprises: a network interface configured to communicate with a plurality of network entities; a storage apparatus; and a digital processor configured to run at least one computer program thereon. When executed, the computer program: monitors content requests from a plurality of user devices, each content request comprising information identifying an individual one of the plurality of user devices; identifies a subscriber account associated with the individual user device; identifies a plurality of additional user devices also associated with the identified subscriber account; and generates a notification message to send to the individual user device, the notification messages presenting a user of the individual user device with one or more options for delivery of the requested content to the plurality of identified additional devices.

In one variant, the content delivery network comprises a cable television network having at least one content distribution server configured to service the content requests, the content distribution server being in data communication with the apparatus via the network interface.

In another variant, the storage apparatus is in communication with the processor and configured to store a plurality of records, the records identifying a plurality of subscriber accounts and at least one user device associated with each. The plurality of records are updated based at least in part on information received from e.g., a billing entity of the network, and/or information received from the user devices.

In yet another variant, the content requests comprise SIP (Session Initiation Protocol) requests, and the plurality of user devices comprise IP-enabled client devices adapted to support the SIP protocol.

In a further variant, the plurality of identified additional devices are listed in the notification message according to a hierarchy, the hierarchy being determined based on one or more criteria. The criteria comprise e.g., at least: (i) device capabilities; and (ii) user preferences.

In a third aspect of the invention, a method of providing content to a plurality of client devices is disclosed. In one embodiment, the devices are each registered to a subscriber account, and the method comprises: receiving a request for content from a first one of the plurality of client devices; determining a subscriber account to which the requesting client device is registered; identifying a second one of the plurality of client devices also registered to the subscriber account; and generating a notification for display on the first and the second client devices, the notification enabling a user of the first and the second client devices to select delivery of content at one or more of the first and the second client devices.

In one variant, the request comprises at least information uniquely identifying the first client device (e.g., IP address or a MAC address).

In another variant, the act of determining the subscriber account comprises querying a database using at least the information uniquely identifying the first client device, the database comprising an association of each of the plurality of client devices to a subscriber account; and the act of identifying the second client device comprises extracting the association from the database.

In yet another variant, the request comprises at least information identifying the subscriber account; e.g., at least one of: (i) an account number, and (ii) a log-in and password combination. Information is extracted from the request, and the act of identifying the second client devices comprises querying a database using at least the information identifying the subscriber account, the database comprising an association of each of the plurality of client devices to a subscriber account.

In still another variant, the notification is configured to enable a user of the first and the second client devices to select delivery of content at only those of the first and the second client devices having one more desired characteristics.

In a fourth aspect of the invention, a computer readable apparatus is disclosed. In one embodiment, the apparatus comprises a medium adapted to store a computer program for the optimized delivery of content in a network, the computer program comprising instructions which, when executed: determine an association between a plurality of client devices to a single subscriber account; obtain content requests, one of the content requests relating to a request for content at a first one of the plurality of client devices; evaluate one or more aspects of the plurality of client devices; based on the evaluation, selects one or more of the plurality client devices as delivery platforms for the requested content; and present information regarding the selected one or more client devices to a user of the first client device.

In one variant, the computer program is further configured to receive a user selection of at least one of the selected client devices for delivery of the requested content.

In another variant, the content requests are forwarded from at least one content distribution server.

In yet another variant, the presentation of information regarding the selected client devices includes the first client device, and comprises a notification or message sent to at least the first client device for display on a display device associated therewith.

In a further variant, the one or more aspects comprise at least one of: device capabilities; user preferences; and bandwidth requirements.

In yet another variant, the selection of one or more of the plurality client devices as delivery platforms for the requested content comprises selection based at least in part on providing a higher video picture quality than that available with the first one of the client devices.

In a further variant, the selection of one or more of the plurality client devices as delivery platforms for the requested content comprises selection based at least in part on providing a higher quality audio experience than that available with the first one of the client devices.

In a fifth aspect of the invention, headend apparatus for use in a content delivery network is disclosed. In one embodiment, the network comprises at least one content server and a database comprising a plurality of records associating each of a plurality of user devices to subscriber accounts, and the apparatus comprises: a network interface configured to receive content requests directly or indirectly from the plurality of user devices; a storage apparatus; and a digital processor configured to run at least one computer program thereon and configured to, when executed: examine the content requests to identify subscriber accounts associated with each request; query the database to identify a plurality of user devices associated with a particular one of the subscriber accounts of a particular one of the content requests; evaluate one or more aspects of the identified plurality of user devices; based at least in part on the evaluation, select one or more of the plurality of identified user devices as delivery platforms for the requested content; and present the selected one or more of the plurality of identified user devices to a user.

In a sixth aspect of the invention, a method of operating a content delivery apparatus is disclosed. In one embodiment, the method comprises: establishing a communication session between a content source and a first recipient device using a session-based protocol adapted for use on a packet-switched network; transferring packetized content to the first recipient device within the session; establishing a communication session between the content source and a second recipient device; and switching delivery of the packetized content to the second recipient device from the first device.

In one variant, the content source comprises an IP TV (Internet Protocol television) server disposed within a content delivery network.

In another variant, the content delivery network comprises a Hybrid Fiber coaxial (HFC) cable television network, and the packetized content is delivered according to a unicast session over the HFC network via one or more QAM channels.

In yet another variant, the communication session established between the content source and the first recipient device, and the communication session established between the content source and the second recipient device, comprise the same communication session.

In a further variant, the method further comprises: associating the first recipient device and the second recipient device within a database of a network operator; and based at least in part on the association, notifying a user of the first recipient device that the second recipient device is available for receipt of the packetized content.

In another variant, the switching delivery of the packetized content to the second recipient device from the first device comprises the following steps, performed substantially and without further user intervention: suspending display of the packetized content on the first recipient device or a display device associated therewith; recording, on premises recording device, a portion of the packetized content delivered during the suspension; resuming the display of the packetized content on the second recipient device or a display device associated therewith at a later time; and giving the user the option to resume display of the packetized content starting with the recorded portion.

In another variant, the switching delivery of the packetized content to the second recipient device from the first device comprises the following steps, performed substantially and without further user intervention: suspending display of the packetized content on the first recipient device or a display device associated therewith, the suspending comprising suspending delivery of the packetized content to a premises where the first recipient is located; resuming the display of the packetized content on the second recipient device or a display device associated therewith at a later time, the resuming comprising resuming delivery of the packetized content substantially at the point within the packetized content where the suspending was invoked.

In yet another variant, if the content is real-time streaming, streaming to the second device begins as soon as possible after streaming to the first device ceases. This may be useful for example, in cases where licensing requires that only one endpoint is active at a given instant or only one session may exist at a time.

In another variant, the user may be able to manually configure a media device that is not capable of automatic negotiation via an interface.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
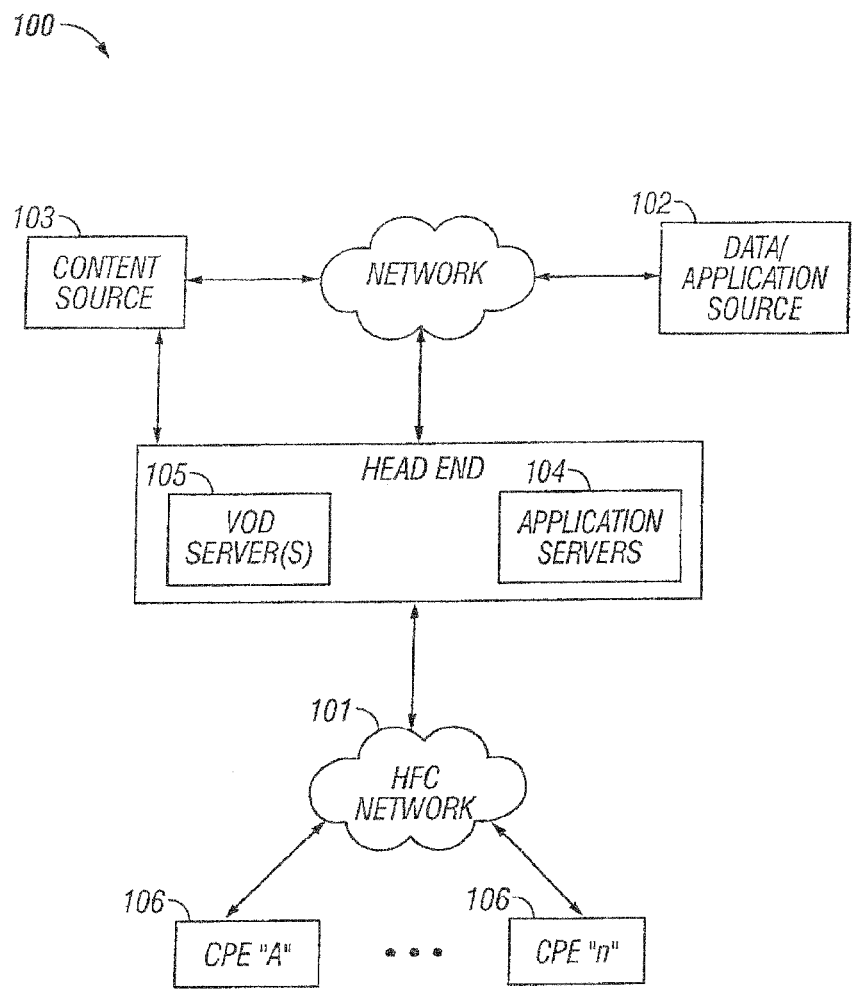
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Customer Premises Equipment (CPE)" refer to any type of electronic equipment located within a customer's or user's premises and connected to a network, including devices having access to digital television content via a satellite, cable, or terrestrial network. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (e.g., Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive. TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), WiMAX (802.16), PAN (802.15), or IrDA families.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e.; IrDA).

Overview

The present invention discloses, inter alfa, methods and apparatus for optimizing content delivery to multiple user devices. One salient functionality of the present invention is to provide the user (e.g., a subscriber of an IP, cable or satellite network) with the best possible "user experience" at all times, depending on the various hardware/software environments they have available to them, and their current usage needs and preferences.

In one embodiment, an optimization and monitoring entity (OME) is utilized in conjunction with other network and user premises components to provide the aforementioned functionality. The OME comprises one or more software applications which work in conjunction with one another (and with one or more content servers) to determine, evaluate, and provide notification to a user of one or more alternative content delivery platforms, such as for example when a request for content is received. Alternative services, transports, and delivery models, may also be recommended in another variant of the invention.

In one exemplary use case, requests for content are received at a content server, and forwarded to the OME. The content server may satisfy the request, or may first require selection of a delivery platform. Information identifying the requesting device (such as IP address, MAC address, etc.) and/or the subscriber account or specific user (such as account number, physical address, login/password information, etc.) is derived from or embedded in the content requests (or otherwise retrieved from information contained within the request). The OME uses the collected information to determine whether the requesting device is registered to a known user account by comparing the identification to a database of registered accounts and devices. The OME uses the aforementioned database to compile a list of all of the other known client devices in a specific user's account. Software applications running on the OME further differentiate the various features and capabilities of the different types of client devices registered to a user account and which may be used to receive content. In one variant, the OME comprises a "recommendation engine" that determines whether requested content may be provided to the same user on a different platform; e.g., on a different one of the client devices associated with the user's account. Such an alternative device may be recommended based on e.g., video/audio quality, picture size, bandwidth availability, and/or any other additional capabilities of the recommended client device, or may be recommended based on historical usage or other information about the user (or a specification of user preferences associated with the account and accessed by the OME).

In one implementation, a list of the alternative delivery platforms and/or modes is presented to a user via a notification generated by the OME (or generated by the CPE after being triggered by the OME). The notifications sent to the client device(s) indicate which, if any, of the user's other devices may receive the content alternatively (or in addition to) the content being received at the requesting device. The notifications generated/triggered by the OME may, in one embodiment, be interactive in nature and provide a user the ability to select one or more of the presented content delivery platforms, as well as features or configurations associated therewith.

The client devices requesting content and/or being recommended for the delivery of content may include, inter alia, consumer premises devices (CPE) 106 (such as digital set top boxes (STB), IPTV devices, media bridges (MB), converged premises devices (CPD), etc.), personal video recorders (PVR), digital video recorders (DVR), network DVR, computer devices (such as personal computers (PC) and laptop computers), and mobile devices (including personal media devices (PMD) and mobile telephones). In one variant of the invention (so-called "chain mode"), the recommendation engine evaluates two or more communicating client devices along a "rendering path" to determine the ultimate delivery configuration to the user (e.g., to prevent instances where the first device encountered in the chain provides the recommendation engine with a false representation of the quality of the entire rendering chain of devices).

In another aspect of the invention, a centralized control device is disclosed which permits the transfer or migration of content delivery sessions (e.g., SIP-based IPTV sessions or the like) between two or more devices. In one implementation, the user's premises gateway or DSTB or PC is used as the host device for a user interface which shows the various premises (and "off-net") devices associated with the user/subscriber account, and their interconnectivity. GUI functionality (e.g., a multi-touch-screen GUI, drag-and-drop, speech recognition application, or other interface/input device) allows the user to rapidly designate particular devices for communication and establishment of a session/delivery of content, and/or transfer existing communication sessions between capable devices (such as may be determined by the OME recommendation engine).

Methods for utilization of the foregoing functionality, and a business rules engine for directing or adjusting the use of the optimization process, are also described herein.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices, the general principles and advantages of the invention may be extended to other types of networks and architectures, whether broadband, narrowband, wired or wireless, or otherwise, the following therefore being merely exemplary in nature. For example, a satellite receiver and delivery network, or alternatively an IP-based delivery network may be utilized. A WiMAX (IEEE Std. 802.16) broadband delivery network or transport could also be utilized. Hence, the optimization techniques discussed herein are largely agnostic to the delivery network used to provide content, as described in greater detail below.

It will also be appreciated that while described generally in the context of a consumer (i.e., home) end user domain or premises, the present invention may be readily adapted to other types of environments (e.g., commercial/enterprise, government/military, healthcare facility, etc.) as well. Myriad other applications are possible.

It is further noted that while described primarily in the context of a cable delivery system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

In a further embodiment, if the content is real-time streaming, streaming to the second device may begin as soon as possible after streaming to the first device ceases. This may be useful in cases where licensing requires that only one endpoint is active at a given instant.

In another aspect, a web portal like interface may provide an option to manually configure a media device that is not capable of automatic negotiation. This may be done by a user selecting a device class from a menu, then a manufacturer, then a model type and version.

This interaction then indicates that the device is accepted or supported and streaming commences.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor web site, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. As will be discussed in greater detail below, other consumer devices may be utilized in conjunction with or in lieu of the CPE 106. Also discussed below, the CPE 106 of FIGS. 1-1d may be more broadly referred to throughout the present application as client devices 206.

Figure 1A:
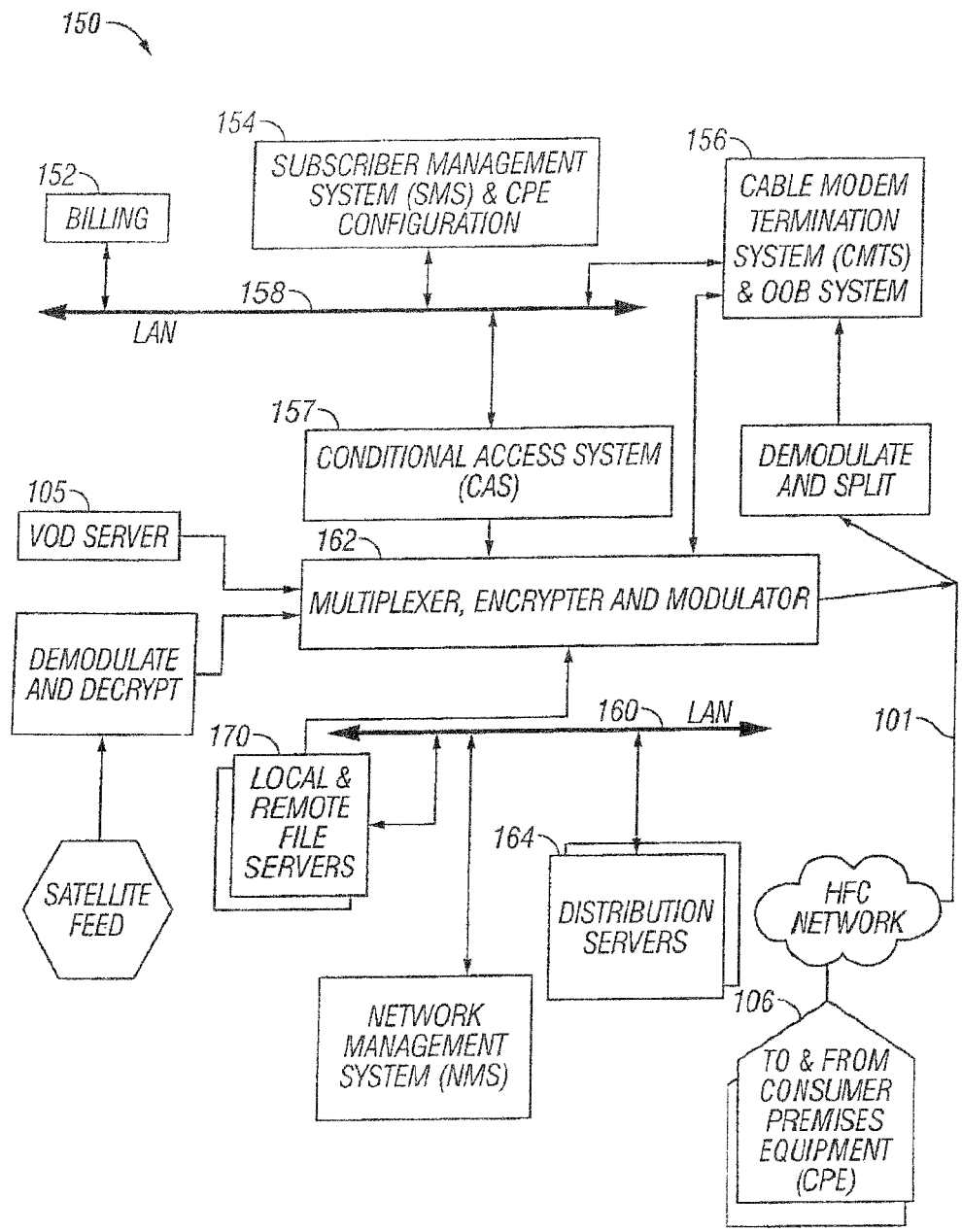
FIG. 1a is a functional block diagram illustrating one exemplary HFC cable network headend configuration useful with the present invention.
Figure 1B:
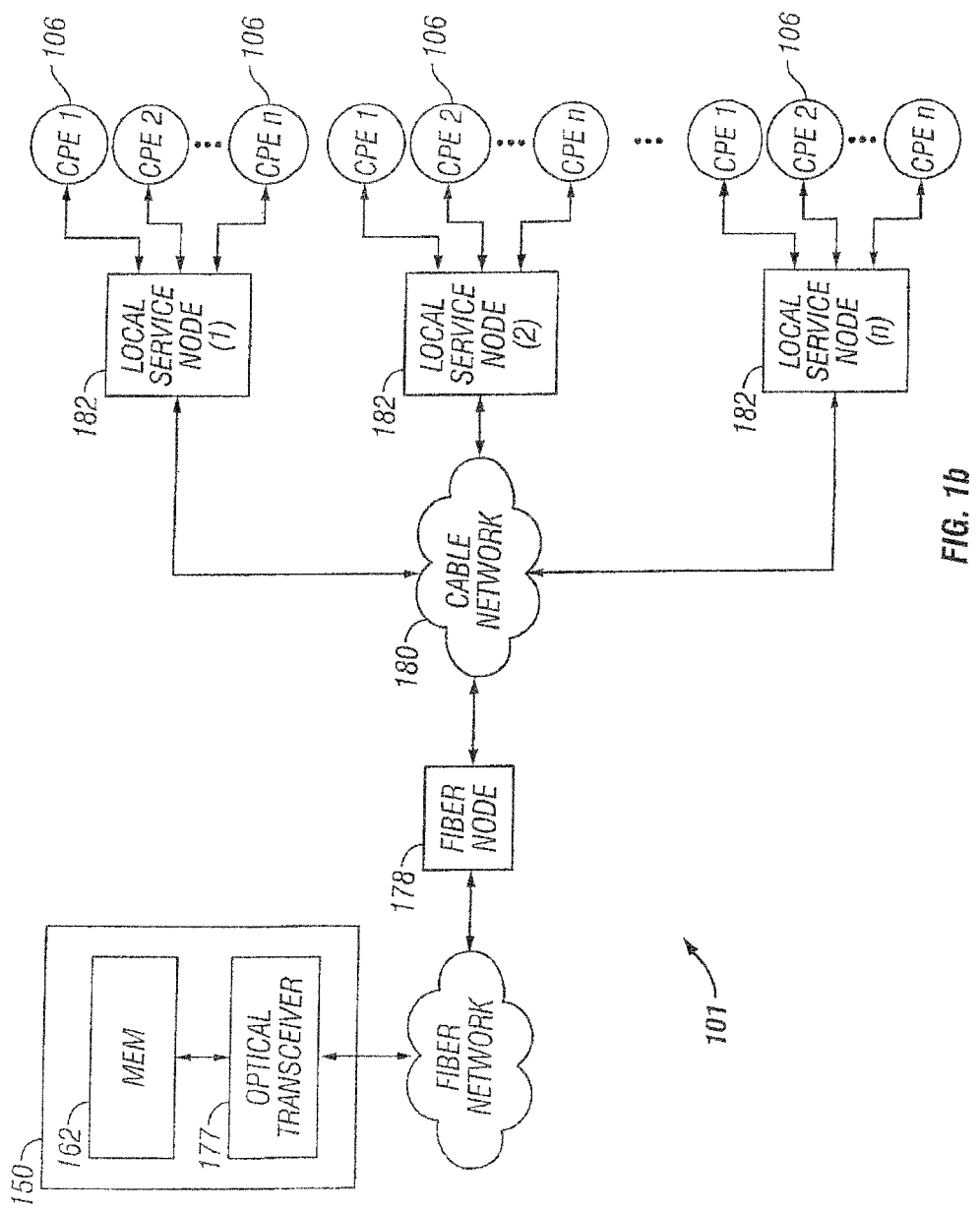
FIG. 1b is a functional block diagram illustrating one exemplary local service node configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1*a* further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

Figure 1C:
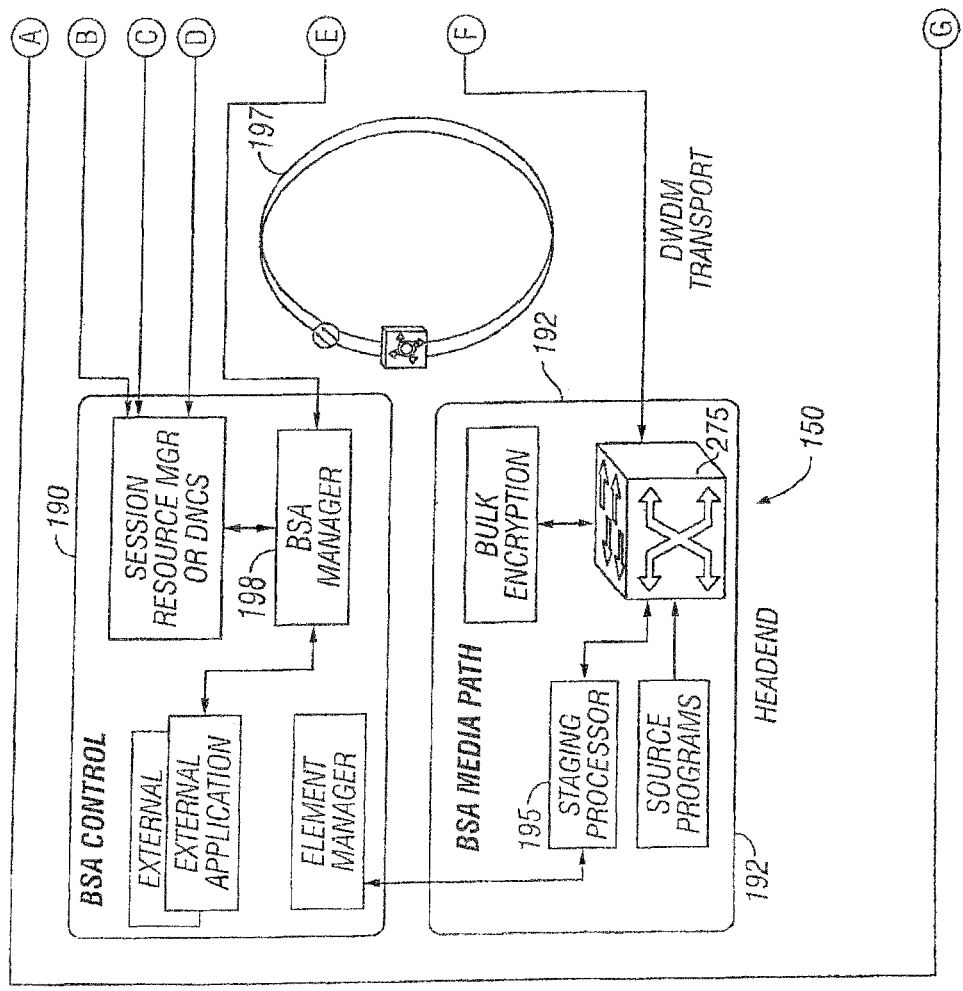
FIG. 1c is a functional block diagram illustrating one exemplary broadcast switched architecture (BSA) network useful with the present invention.
Figure 1C:
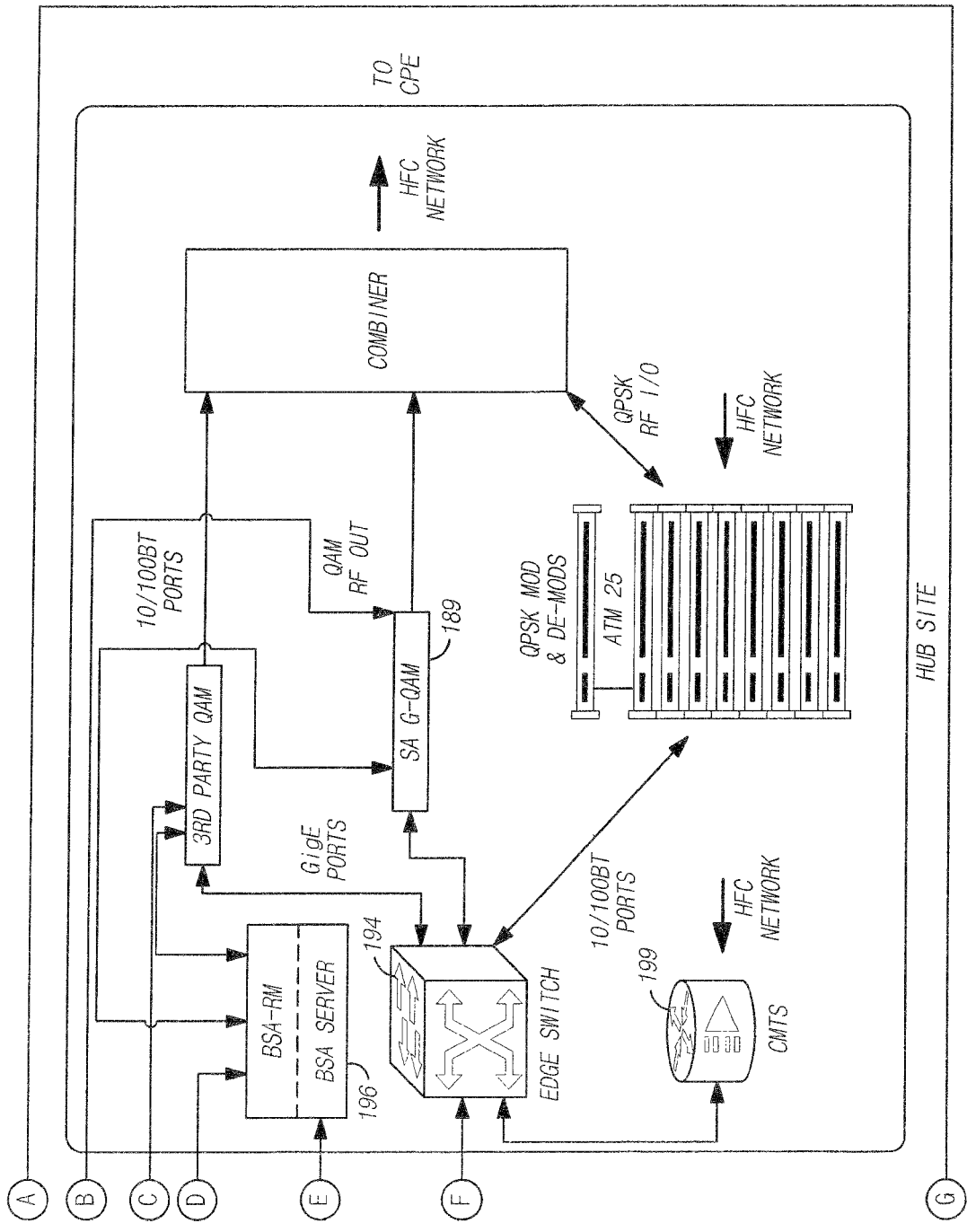

FIG. 1*c* illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1*c* shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and U.S. patent application Ser. No. 09/956,688 filed Sep. 20, 2001 and entitled "Technique for Effectively Providing Program Material in a Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1*a* and 1*c* also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based DSTBs) over the aforementioned DOCSIS channels comprising MPEG (or other video codec such as 11.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAIVI-modulated RF) channels to the CPE. The IP packets are typically transmitted on RF channels that are different that the RF channels used for the broadcast video and audio programming (e.g., DOCSIS QAMs), although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
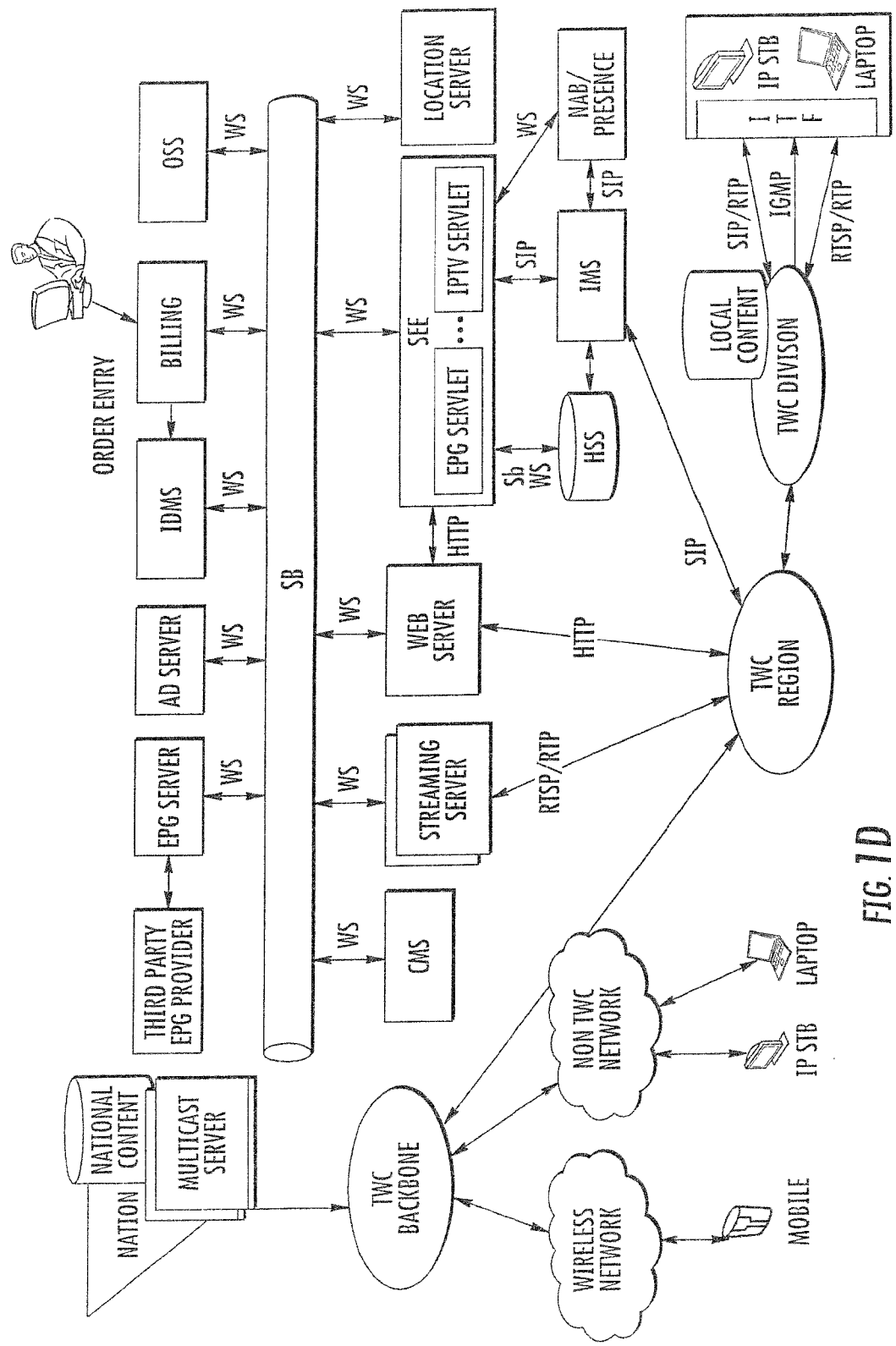
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1*d* illustrates one exemplary implementation of such a network, in the context of a 3GPP IMS (IP Multimedia Subsystem) network with common control plane and service delivery platform (SDP), as described in U.S. provisional patent application Ser. No. 61/256,903 entitled "METHODS AND APPARATUS FOR PACKETIZED CONTENT DELIVERY OVER A CONTENT DELIVERY NETWORK, previously incorporated herein. As will described in greater detail below, such a network provides significant enhancements in terms of common control of different services, implementation and management of content delivery sessions according to unicast or multicast models, etc.; however, it is appreciated that the various features of the present invention are in no way limited to such an architecture.

Optimization Network Architecture—

Figure 2:
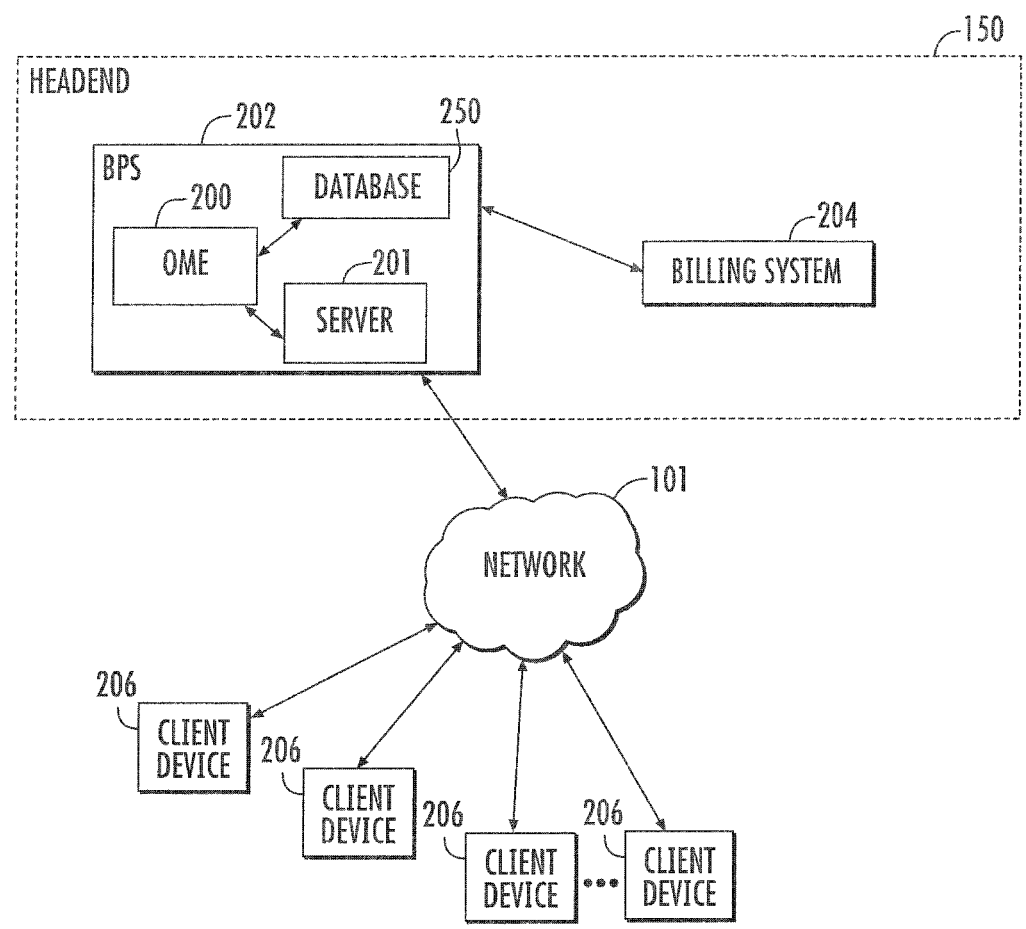
FIG. 2 is a functional block diagram illustrating a network architecture useful with the present invention.

Referring now to FIG. 2, one embodiment of a network architecture for use in providing delivery platform/mode optimization is illustrated. It will be appreciated that the network architecture of FIGS. 2-2b may comprise components discussed in FIGS. 1-1d, as well as other or additional components not specifically disclosed therein.

Figure 2A:
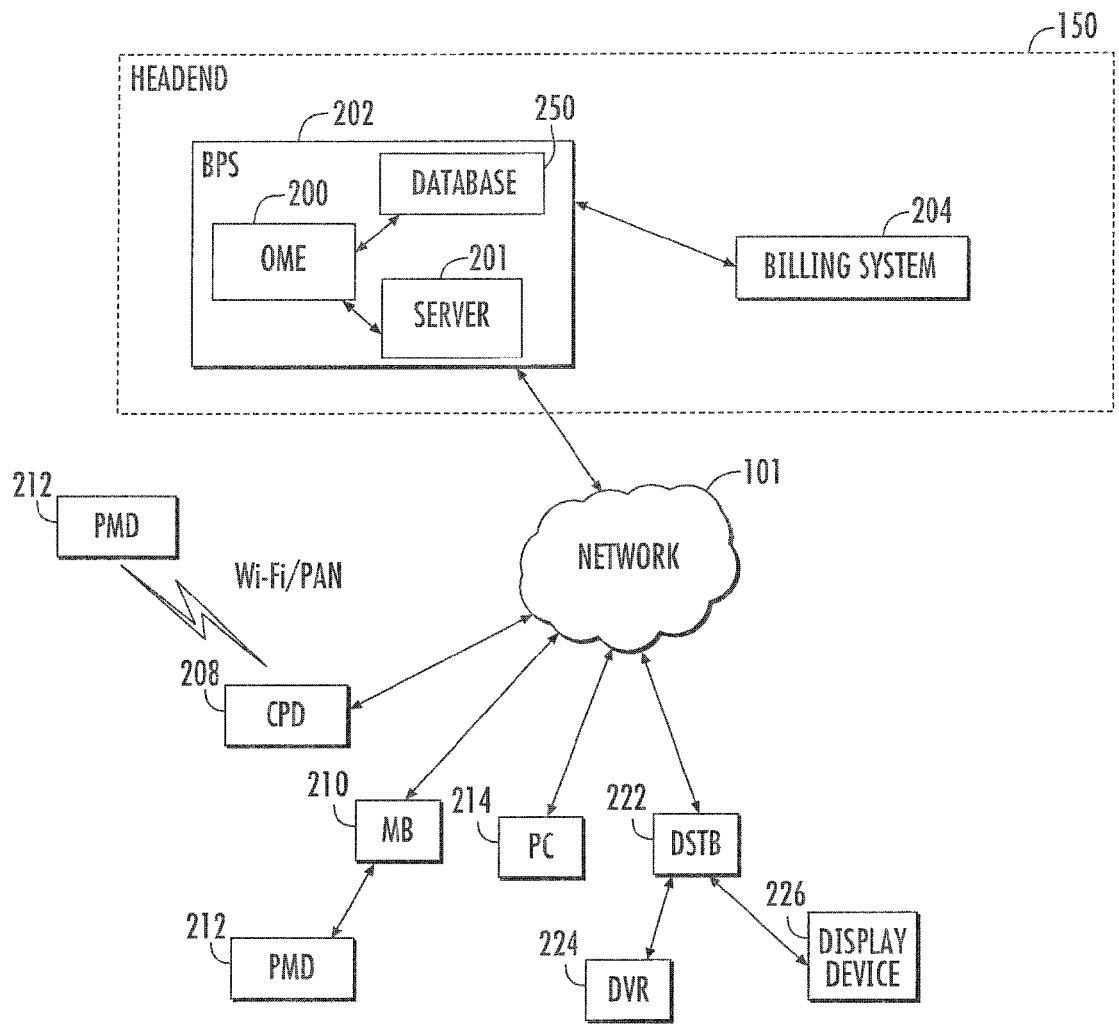
FIG. 2a is a functional block diagram illustrating another network architecture useful with the present invention.
Figure 2B:
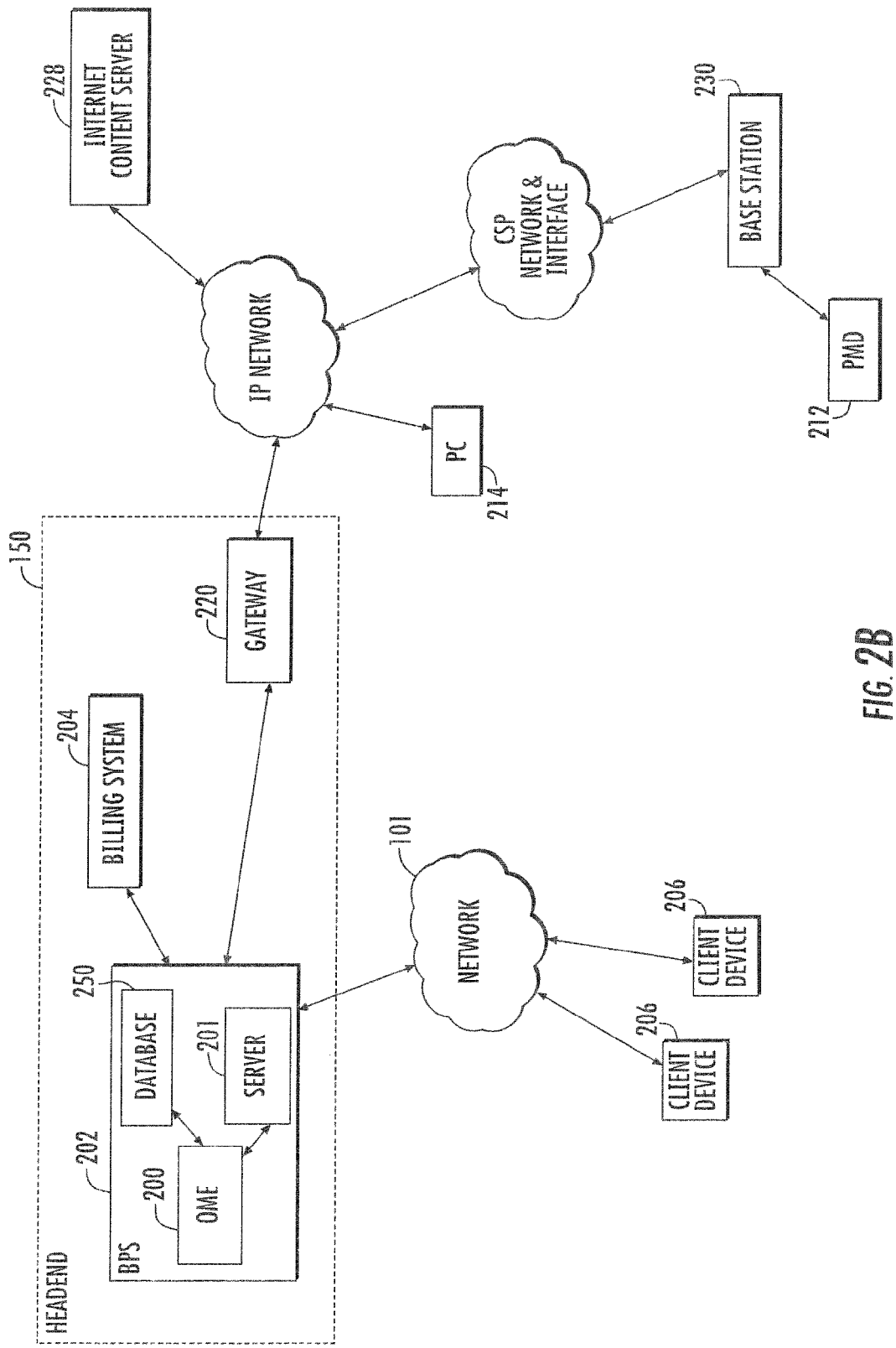
FIG. 2b is a functional block diagram illustrating yet another network architecture useful with the present invention.

As shown, the network of FIGS. 2-2b comprises a plurality of client devices 206 which receive content from a broadband provisioning system (BPS) 204 of a network headend 150 via the network 101.

Generally, the BPS 204 is responsible for sending or controlling delivery of content to the various client devices 206. It is noted that the client devices 206 discussed herein may include, inter alia, consumer premises devices (CPE) 106 (such as set top boxes (STBs), IPTV enabled DSTBs, media bridges (MBs), converged premises devices (CPDs), etc.), personal video recorders (PVR), digital video recorders (DVRs), network DVR, computer devices (such as personal computers (PCs) and laptop computers), and mobile devices (including personal mobile devices (PMDs) and mobile telephones). The client devices 206 may comprise any number and type of apparatus for the delivery of data and/or content to a user, the foregoing being merely illustrative. Individual ones of these client devices 206 will be discussed in greater detail below with respect to FIGS. 2a-2b and 5.

It is further noted that throughout the present disclosure, each of the above-described devices (including the PMD 212, PC 214, STB 222, DVR 226, display device 224, CPE 106, and CPD 208 of FIGS. 1-2b) will be collectively referred to herein as "client devices" 206.

The network illustrated at FIG. 2 shows a BPS 202 comprising a server entity 201, a database 250 and a monitoring and optimizing entity (OME) 200. The server entity 201 of the BPS 202 in one embodiment comprises a control and protocol translation server. In one embodiment, the protocol translation is implemented in a cable modem home gateway or other such premises device. The cable modem home gateway translates between an MSO-specific private network-facing protocol and a CE-device facing protocol. According to this embodiment, the MPEG video is carried in MPEG transport streams on 6 MHz QAM channels without any DOCSIS framing or IP wrappers. The modem in the home applies the IP wrapper at the time the flow out of the modem is initiated, and includes source and destination addresses. Tuning or other stream acquisition and termination transactions may also be included in this translation.

The BPS 202 may be used to collectively refer to one or more of the headend 150 entities discussed above with respect to FIGS. 1-1d, and may further comprise additional entities discussed herein below. However, it is appreciated that the BPS 204 may comprise any number of distinct or integrated entities or components, whether co-located or physically removed from one another, that collectively responsible for providing or otherwise controlling the delivery of data/content to the client devices 206. For example, one or more components of the BPS 204 may be disposed at various other locations (i.e., besides the headend 150) as desired, consistent with the architecture implemented; e.g., at the BSA hub in a BSA network, or at a third party location off MSO premises.

In one embodiment, content is provided to the client devices 206 directly via the server 201 of the BPS 202; e.g., as an IP packet stream or via a SIP session. In another embodiment, the BPS 202 merely directs other content delivery processes or entities to deliver content to the CPE 206.

In the illustrated embodiment, the server 201 receives content requests from various ones of the client devices 206 and, only after it is determined that the requesting client device 206 is "entitled" to receive the content, the server 201 provides (or causes the provision of) the content thereto. The determination of whether a device is "entitled" to receive content is accomplished using any number of different mechanisms; see, e.g., the methods and apparatus disclosed in co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK" incorporated herein by reference in its entirety. As discussed therein, a request for content is received from the client device 206 at the server entity 201 of BPS 202. An entity at the BPS 202 (such as the OME 200, the server 201, or another entity) obtains information identifying the user account (such as subscriber identification number, account number, device ID such as MAC address or IP address, etc.), and uses this information to request entitlements from an entitlements server (not shown) located elsewhere at the headend 150. Based on the results returned from the entitlements server, the BPS 202 will either grant or deny the request. The entitlements server accesses subscription information in a subscriber and device database 250 to obtain sufficient information to determine the entitlements of the subscriber. In one implementation, the content server 201 or OME 200 may include the functionality of the aforementioned entitlements server therein.

In one embodiment, the server 201 of FIG. 2 comprises an application server (AS) such as the Mystro™ server device of the type utilized by the Assignee hereof as discussed in co-owned, co-pending U.S. patent application Ser. No. 10/263,015 filed Oct. 2, 2002 and entitled "Network based digital information and entertainment storage and delivery system", now published as U.S. Patent Application Publication No. 2003/0208767, which claims priority under 35 U.S.C. 119(e) the benefit of U.S. Provisional Application No. 60/377,963 filed on May 3, 2002, each of the foregoing incorporated herein by reference in its entirety. As discussed therein, the client devices 206 may communicate with the AS to receive content and/or notifications. The AS may be further adapted to perform content processing functions such as e.g., reformatting program streams (transcoding, transrating, etc.), and implementing trick mode functionality.

The OME 200 may comprise one or more software applications which, inter alia, monitor content requests received at the content server 201 of the BPS 202. A copy of each of the content requests received at the content server 201 is forwarded to the OME 200 (e.g., via inter-process message, or other communications link between the two processes). The content requests include information identifying the requesting device 206 (such as IP address, MAC address, TUNER_ID, etc.). The content request may further identify the subscriber account, such as account number, subscriber address, or by a user entered login password combination, etc., although it will be appreciated that only one piece of device- or account/subscriber-specific information is required to initiate the optimization process. In other words, a content request may be made by a subscriber subsequent to, or in conjunction with, logging or signing in (such as via their on-screen display, to a website or other service, etc.). As will be described in greater detail below, the OME in other embodiments may function to optimize user delivery platforms and/or mode on a "passive" or unsolicited bases (e.g., periodically, or not upon any particular user content request or other action).

The OME 200 determines, based on the unique identification of the requesting device 206 and/or information regarding the subscriber account, whether the device 206 is registered to a known user account by comparing the identification to a database 250 of registered accounts and devices. As will be discussed below, the database 250 includes a plurality of records associating one or more devices to individual user accounts.

Software applications running on the OME 200 (discussed below) differentiate and evaluate the various features and capabilities of the different types of client devices 206 which may be used to request and receive content for that account.

The OME 200 software application's evaluation of the above-disclosed information determines (i) whether requested content may be provided to the same user on different platforms; e.g., on one or more other client devices 206 associated with the user's account, and (ii) recommends delivery at ones of these devices to the user. This process is generally conducted with respect to an optimization goal or strategy (or according to a prescribed rule set), such as maximizing "user experience". As used herein, the term "user experience" generally refers without limitation to the quality and/or level of satisfaction that a user obtains from viewing or experiencing the content. However, other optimization goals/rule sets may be employed, such as for example maximization of profit or revenue for the MSO (or advertisers or content providers), bandwidth conservation, and so forth.

In one exemplary implementation of the aforementioned "user experience" optimization, a client device 206 may be recommended to the user based on e.g., video/audio quality (e.g., SD versus HD or up-converted SD capability), picture size, bandwidth availability or capability (e.g., broadband versus narrowband data delivery), and/or any other additional capabilities of the recommended client device 206, as will be discussed if further detail below.

The recommended devices 206 are in one embodiment presented to the user in a notification message, on-screen display window, icon, etc. which enables the user to select one or more devices for delivery. In an alternative embodiment, the notification may include all devices irrespective of any evaluation/recommendation (or, with the recommended devices annotated or highlighted within the complete list). A priority order (e.g., best-to-worst option ranking) or similar function may also be provided.

In yet another embodiment, the OME 200 may comprise the functionality and storage capability disclosed above as being attributed to the database 250. FIGS. 2a-2b illustrate other exemplary embodiments of network architectures configured according to the present invention. The network architectures in FIGS. 2a-2b evidence various ones of the aforementioned client devices 206 which may be used to receive content, and the various pathways for content delivery thereto (and movement of content there between).

In the example illustrated in FIG. 2a, one client device 206 is a PMD 212, which receives content via either a converged premises device (CPD) 208 or a media bridge 210. Other illustrated client devices include a PC 214, and a IP-enabled DSTB 222 passing content to a DVR 224 and/or display device 226.

The CPD 208 of FIG. 2a may, for example, be of the type described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety. As discussed therein, the CPD 208 comprises a WLAN (e.g., Wi-Fi) and/or PAN (e.g., Bluetooth or 802.15) wireless interface. Packetized (e.g., IP) traffic may be exchanged between the CPD 208 and one or more PMD 212 via, e.g. the WLAN/PAN interface. Hence, in one embodiment, the PMD 212 may request content from the CPD 208, which in turn requests content from the BPS 202. The requested content may then be provided to the PMD 212 via the CPD 208 accompanied by the list of other client devices 206 which are recommended by the OME 200 for receiving the requested content. Where content is requested at a device 206 other than the PMD 212, the PMD 212 may appear on a list of recommended devices provided to that requesting device 206.

Also illustrated at FIG. 2a, a media bridge (MB) apparatus 210 may be utilized to provide content to the PMD 212. The MB apparatus 210 may be, for example, of the type disclosed in co-owned, co-pending U.S. patent application Ser. No. 12/480,597 filed Jun. 8, 2009 and entitled "Media Bridge Apparatus and Methods", incorporated herein by reference in its entirety. As discussed therein, the MB apparatus 210 acts as a connection between a PMD 212 (which may include e.g., an impo$^{rt}$, handheld computer, smartphone, PDA, etc.) and a network. This bridging apparatus 210 may be used, for example, to convert content stored on the PMD 212 to a format capable of being presented on a user's set-top box or other client device. The bridging apparatus 210 may also be utilized for transmitting content to the PMD 212 (such as by converting the content to a format capable of being stored/presented on the PMD 212), provided the user of the PMD 212 is authorized to receive the content. When the PMD 212 requests content from the network 101 via the media bridge 210, the OME 200 may recommend alternative delivery platforms (e.g., other client devices 206) for viewing the content. Further, the OME 200 may suggest a PMD 212 for content delivery (via the MB 210) when a request for content is received from another client device 206.

In yet another embodiment, the client device 206 may comprise a personal video encoder (PVE) or comparable device (not shown). For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB (or other device), and has a TV tuner inside. The user tunes to a given channel, and the PVE encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as they have access to the IP distribution network. This functionality can be made part of a separate physical component, or alternatively have some or all of its functionality disposed within the PVE itself. It may also be integrated with other devices (such as connected CPE 106 or PMDs 212). It will be appreciated that the PVE may also be configured to receive other device recommendations and may be recommended as a platform alternative for other devices as discussed above.

In the context of the exemplary architecture of FIG. 2a, suppose for example that a user registers the PC 214 and the STB 222 (in communication with the DVR 224 and display device 226) with the MSO billing system 204. The device registration is then updated to the OME 200, so that the OME may build a database 250 of user accounts and devices registered thereto (as will be discussed below with respect to FIG. 2c).

Suppose now that the user uses the PC 214 to request "IP TV" content (i.e., IP protocol packetized video content); this request is forwarded through the network 101 to the OME 200. As the requested content is prepared for transmission to the requesting device (i.e., PC 214) via the content server 201, the OME 200 determines the subscriber account associated with the request and determines whether any other devices in the subscriber's account should be recommended as alternate delivery platforms. In the present example, the OME 200 will determine that the user of the PC 214 is also associated with the IP-enabled DSTB 222 (here, in communication with both a DVR 224 and display device 226). In one embodiment, the OME 200 will provide the user of the PC 214 a message or display notification indicating that the IPTV content is available for viewing at the display device 226 and/or delivery to the DVR 224. Alternatively, the notification may be reserved only for those instances where an evaluation of the both the PC 214 and the DSTB 222 (including display 210 and/or DVR 212 options associated therewith) reveals that, based on the capabilities of these devices, there is some advantage in providing the content to the user on these devices 222, 210, 212. For example, the OME 200 may evaluate the PC 214 (e.g., based on device profiles maintained at the headend/OME, or via profiles obtained from the device themselves upon request) and DSTB 222 and determine that, based on picture and sound quality available at the display device 226 and/or based on the convenience associated with the DVR 224, it is more desirable for the user to view and/or record the live broadcast programming content at the display device 226 or DVR 224 rather than (or simultaneously to) viewing at the PC 214.

Referring now to FIG. 2b, another exemplary embodiment of network architecture useful with the present invention is given. According to this embodiment, a gateway device 220 is utilized to provide internet content from an internet content server 228 to one or more client devices 206 via the network 101. The gateway device 220 may be of the type disclosed in co-owned and co-pending U.S. patent application Ser. No. 12/582,619 entitled "Gateway Apparatus and Methods for Digital Content Delivery in a Network" filed on Oct. 20, 2009 and incorporated herein by reference in its entirety. As discussed therein, the gateway device 220 is disposed at the headend 150 of the network 101 and is configured to request and receive internet content from one or more host servers 228 via the Internet. The internet content is then processed and delivered to one or more client devices 206. In one embodiment, processing at the gateway device 220 may include de-encapsulating the received internet content from a first media file container format and subsequently re-encapsulating the internet content to a second media file container format which is compatible with one or more receiving devices (such as client devices 206). According to this embodiment, the gateway device 220 may process received content automatically into various alternative encapsulation formats or, may encapsulate as needed to the format of the specific requesting device 206; the gateway device 220 may also store the requested and re-encapsulated content to satisfy future user requests. It is further appreciated that the gateway apparatus 220 may function to provide multiple alternative delivery paradigms for the delivery of internet content to the client devices 206, including delivery according to traditional broadcast mechanisms (e.g., linear delivery via downstream in-band QAM) and VOD delivery mechanisms.

As is also illustrated, a user's PC 214 may directly access internet content from the internet content server 228 via the IP network. Still further, a user may access internet content at a PMD 212 via a base station 230 in communication and connected to the internet content server 228 via both the IP network and a cellular service provider (CSP) network and interface.

Content delivery controlled by the server 201 to one or more. PMD 212 may occur via the methods and apparatus discussed in co-owned and co-pending U.S. patent application. Ser. No. 11/258,229 entitled "Method and Apparatus For On-Demand Content Transmission and Control Over Networks" filed Oct. 24, 2005, incorporated herein by reference in its entirety. As discussed therein, content may be delivered on-demand to the PMD 212 via a "point-to-point" approach, wherein a session is established between a content receiving entity (such as a PMD 212) and a distributing entity (e.g., server 201). In one variant, session establishment and data flow control are advantageously implemented using protocols and bandwidth that are typically used for (i) providing on-demand services to subscribers within the cable network, and (ii) delivery and control of streaming multimedia to client mobile devices. Thus, information regarding distribution of content to various PMD 212 as well as other information regarding the user's activities with respect to the content (such as stopping, restarting, fast forwarding, etc.) may be collected at a server entity 201 of the headend 150, via the associated IP gateway and cellular service provider, and processed to (AMDR) messages, which are stored and/or analyzed.

Hence any of the PMD 212, PC 214 and CPD 208 of FIG. 2b may receive alternative platform notification or recommendations, and/or be listed as recommended/available devices. Suppose for example that a user registers each of the illustrated client devices 206, 214, 212 to the user's account. This information will be stored in a database 250 in communication with the OME 200 (as will be discussed below with respect to FIG. 2c). When a user at the client device 206 requests content from the internet content server 228 (via a the gateway apparatus 220), the OME 200 determines, based at least in part on a query of the user account and device database 250, that the user of the client device 206 may access the same content at the user's PC 214 and/or PMD 212. The OME 200 may automatically recommend one or more of the other user devices (e.g., PC 214 and/or PMD 212) for delivery of the content, based on a user preference template or rule set (e.g., "always recommend other available platforms between the times of 7:00 am and 9:00 pm"). Alternatively, the OME 200 may utilize an algorithm for determining whether it would be optimal to provide the content at any of the other user devices (e.g., PC 214 and/or PMD 212).

It should be noted that the embodiments described herein of the premises network topology shown in FIGS. 2-2b are merely exemplary of the broader principles of the invention; many other network configurations and possible topologies can be utilized.

Figure 2C:
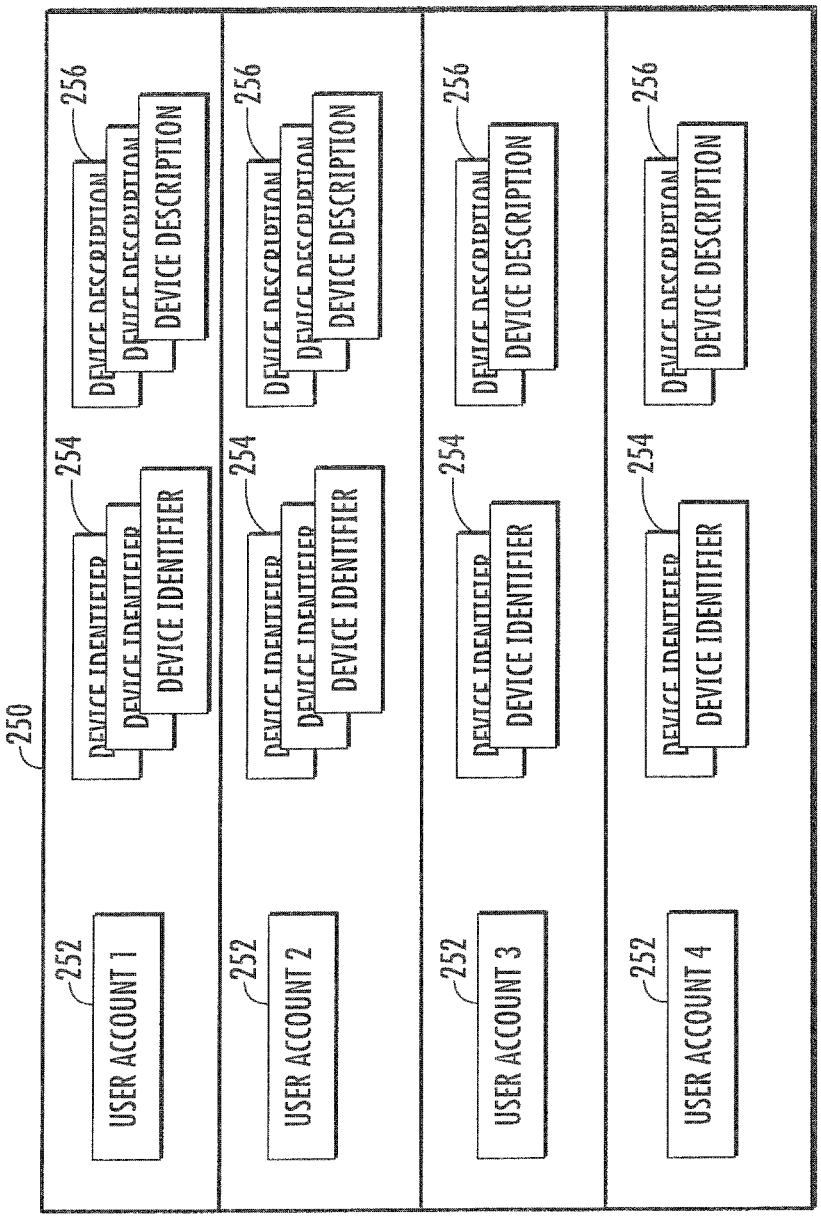
FIG. 2c is a functional block diagram illustrating an exemplary user account and device database.

Referring now to FIG. 2c, an exemplary user account and device database 250 is given. As shown, the database 250 contains a plurality of records 252, 254, 256. Each user account record 252 identifies a single user account (such as by name, address, and/or account number).

The user account records 252 are linked to one or more client devices 206 which are each identified in the database 250 by a device identifier 254. In one embodiment, the device identifier 254 may comprise a MAC address, IP address, TUNER_ID, or other unique device identifier. The user account records 252 may further comprise information relating to a login and password combination used by a user to verify the user as being associated with that account. The device identification records 254 are updated via messages received from the billing system 204, or another entity (such as an MSO server used to service subscriber logins and account changes performed over the Internet). In this manner, only current devices and current subscription information is kept in the database 250 and used for recommending delivery platforms.

Each device 206 may be optionally associated with a device description file 256. The device description file 256 describes the features and capabilities of the devices 206 within a user's account, such as for example configuration information. This configuration information might include e.g., (i) type and version of operating system; (ii) type and version of codecs installed (e.g., H.264, MPEG, Real, WMP, etc.); (iii) memory and/or mass storage device capacity; (iv) display type and resolution (e.g., 1080p); (v) communications interfaces/protocols (e.g., USB, IEEE-Std. 1394, Ethernet, UPnP, Wi-Fi, WiMAX, DOCSIS, etc.); and (vi) capabilities/function support (e.g., DRM, DNLA, DCAS). The device description file 256 may be derived by the OME 200 and/or the billing system 204 based on the device identification (see below). Alternatively, the devices 206 themselves may be configured to provide capabilities information in the form of a description file 256 or message (as will be discussed further below).

In another embodiment, the network architecture described in U.S. Patent Application Ser. No. 61/256,903 entitled "METHODS AND APPARATUS FOR PACKETIZED CONTENT DELIVERY OVER A CONTENT DELIVERY NETWORK" previously incorporated herein, may be utilized in conjunction with or as an alternative to the architecture discussed above with respect to FIGS. 2-2b. As discussed therein, a substantially session-based and packetized content delivery approach (e.g., using the well known Internet Protocol) is used, which allows for temporal, device, and location flexibility in the delivery of the content, and transportability/migration of user sessions, as well as service/content personalization (e.g., on a per-session/user basis) and blending (integration). This approach uses a common or unified delivery architecture. In one exemplary implementation, the network is based on an IMS (IP Multimedia System) which includes SIP session protocols, as well as a Service Delivery Platform (SDP). The IMS/SDP also uses a common control plane and service layer, which advantageously provide a high level of service integration. In another implementation, the network comprises both "managed" and "unmanaged" (or off-network) services, so that a network operator can utilize both its own and external infrastructure to provide content delivery to its subscribers in various locations and use cases. In another aspect, the invention leverages so-called "super" headends (which provide a high degree of centralization of functions such as content storage, processing and back-office functions) to allow for more flexible delivery, as well as enhanced "service velocity". A substantially network-based user interface (UI) architecture is employed which permits the network operator (or a designated proxy entity) to manage and rapidly reconfigure the UI for particular premises, subscribers (or even particular devices of that subscriber/premises), thereby greatly aiding personalization and service velocity. For example, a new service selected by a user can be reflected in that user's UI simply based on a download and installation from a network "UI" server, so that no service call or "truck roll" is needed. Moreover, the different UIs of the network operator can be adapted to different device paradigms (e.g., premises DSTB/HDTV monitor, PC, laptop, handheld mobile device, etc.), so that a common user and/or account "theme" and preference set is maintained across the different devices. This UI architecture can also leverage next-generation content display, organization, interactivity, and recommendation engine technologies, thereby providing for a richer and more subscriber-specific (personalized) media experience.

Methodology—

Figure 3A:
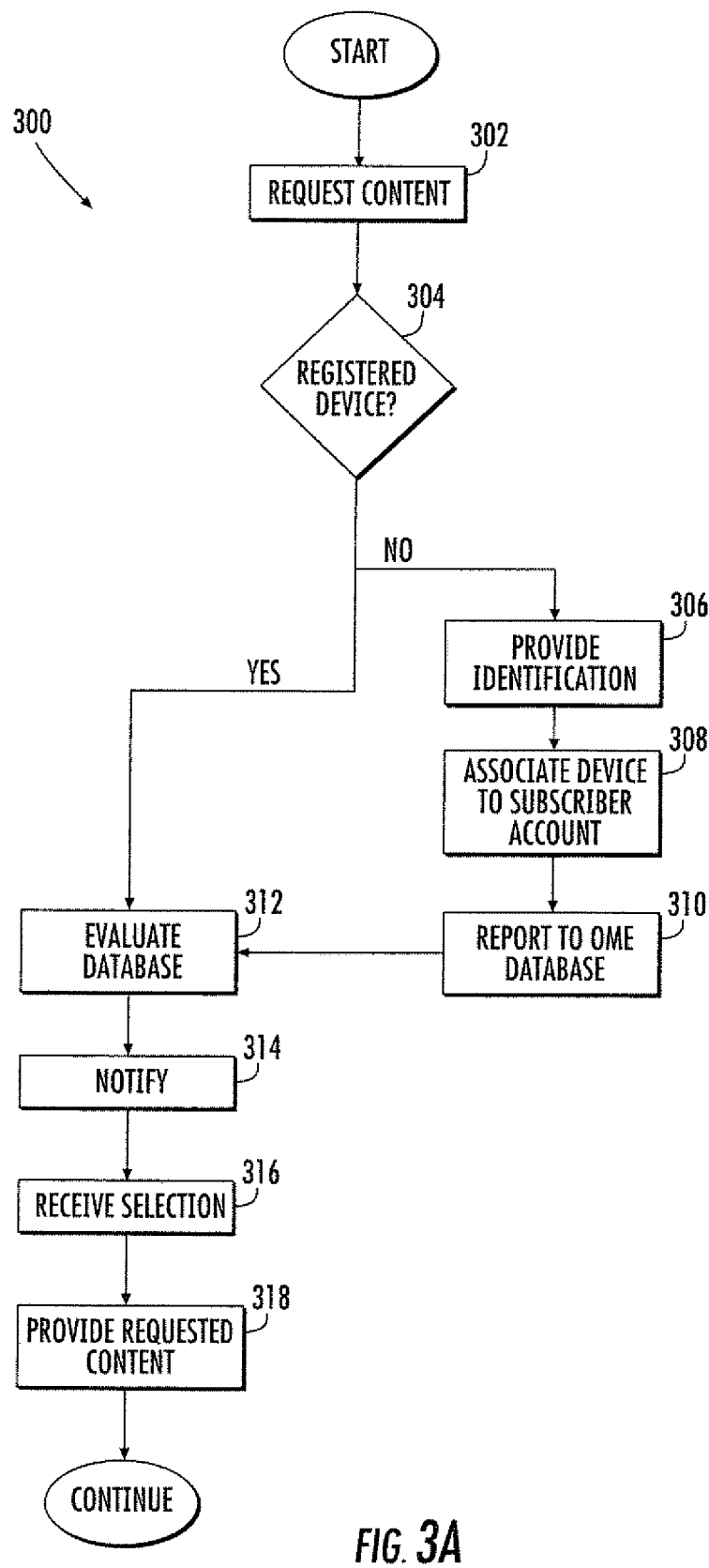
FIG. 3a is a logical flow diagram illustrating one embodiment of a method for monitoring and optimizing content delivery according to the present invention.

Referring now to FIG. 3a, a first embodiment of the method for monitoring and optimizing content delivery in a content delivery network is given.

Per step 302 of the method 300, content is requested by one or more CPE 106. The content request is received at the server entity 201 of the BPS 202 and a copy of the request is forwarded to the OME 200. The content request may constitute for example an on-demand request (e.g., VoD or the like), PPV request, IPTV delivery session establishment (e.g., via SIP session), request for an application download (e.g., a gaming application from a carousel or other location), accessing and requesting download from an Internet website or server location, or request for an EPG or content directory.

In one embodiment, the requested content may be immediately provided to the requesting device by the server 201, provided the requesting device is entitled to receive the content. For instance, information within the content request identifying the device (such as by IP address or MAC address) and/or the subscriber account (such as by subscriber account number or other subscriber identification) may be used to determine the entitlement of the requesting device to receive the content. The methods and apparatus disclosed in co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK" previously incorporated herein, may be utilized to determine content access entitlements. Alternatively, the requested content may only be delivered to an entitled requesting device once the user has selected a delivery option from among the recommended options, as discussed below.

Per step 304, the OME 200 uses information contained in the content request (information identifying the device and/or the subscriber) to determine whether the device is registered. In order to determine whether a device is registered, the OME 200 may compare the information received to information stored in the subscriber and device database 250. For example, if the request comprises information identifying the device (e.g., MAC address, IP address, TUNER_ID, or other unique device identifier) the OME 200 will query the database 250 for that device by the identifying information and the query returns a subscriber account record 252 if the device is registered. If the request comprises information identifying the subscriber account, the OME 200 may use this information to determine (based on a query of the subscriber account and associated device records 254) whether content is being requested by a device listed to that subscriber account.

It will also be appreciated that in other embodiments, so-called "off subscriber" devices may be made accessible to the OME. For instance, in one such variant, the subscriber may specify that certain designated devices owned by third parties known to the subscriber can be considered "target"

devices for purposes of upgrades and session migration. For example, an MSO subscriber might designate his girlfriend's PC or DSTB (via, e.g., its MAC or IP address) as an approved device for content delivery, since he frequently watches movies or television at her house. The subscriber's friend may or may not also be an MSO subscriber. Where both parties are MSO subscribers, their accounts may be linked so that one or the other (or both) can be designated as available devices from the perspective of the OME. In the case where the friend is not an MSO subscriber, delivery may necessitate carriage of the content "over the top" of another operator's network (e.g., a competing cable or satellite or HFCu service provider), such as via over the Internet, non-competitor controlled link (e.g., WiMAX transport), or via a cooperative arrangement between the network providers. The subscriber would, in one such variant, log into an MSO portal or website via a user login, password, etc. to initiate a "pull" of content from an extant delivery channel/device to the friend's premises device. For example, the login may allow for a network-generated UI (akin to a website page) being generated on the friend's client device, via which the subscriber could select the content for delivery at the friend's device. Login via the Internet (e.g., via a PC) may be used as well.

It is also appreciated that various embodiments of the invention may be configured so as to distinguish specific users versus accounts. For example, a given subscriber account number may be associated with the premises of a family, yet have multiple different users (family members) associated therewith. Hence, the present invention contemplates that: (i) the account or premises may have a profile or preference set associated with it as a whole (e.g., one preference set for all family members, and a listing of all family member devices); (ii) that individual users may have their own preference sets and device listings, which may or may not overlap with other members (e.g., two different family members might list the living room DSTB/DVR as "their" device); and (iii) combinations of (i) and (ii) (e.g., such as where each member has a separate preference set and device list, but there is a default "family" profile). Hence, content may move or be "upgraded" for individual users largely independent of other users within the same subscriber account under one embodiment of the invention (except e.g., where a "collision" or resource contention would occur, such as where two family members are frying to move different content to the same device at the same time). As used herein, the term "user" therefore can refer to one user or multiple aggregated users.

If the requesting device and/or subscriber account identification information does not match an entry in the database, the device has not been registered. A device must be registered before content may be provided thereto. Hence, per step 306, the device is registered by providing information identifying the device and/or subscriber to the OME 200. At step 308, the OME 200 associates the device to a subscriber account. In one embodiment, this occurs by automatically querying the billing systems via the devices MAC address to develop a default profile. In another embodiment, the device may be configured to automatically provide device identification and/or subscriber account information to the BPS 202. The server maintains historical heuristic data which "mines" or determines device content usage patterns in order to determine a more precise custom profile against client future behavior and usage, in one embodiment. Alternatively, a user may enter some or all of the aforementioned information at a user interface (e.g., web portal run by the MSO), such as by entry of a login and password during a registration process to create a default profile. The OME 200 may verify the entered information at the billing system 204. The OME 200 may also request additional information at the billing system 204. For example, if the device only provides device identification information, the OME 200 may query the billing system 204 for the subscriber account to be associated therewith (step 308). Per step 310, the device and associated subscriber account information are reported to and updated in the database 250 records 252, 254.

The OME 200 may also periodically request updates from the billing system 204 or other cognizant entity to update records in the subscriber and device database 250. In this manner, only the most recently updated lists of devices 206 are used for providing delivery platform notifications (as will be discussed below).

If the requesting device identification matches an entry in the database, the device is determined to be registered and, at step 312, the subscriber account and device database 250 is evaluated to determine whether there are additional delivery platforms (e.g., other devices 206 registered to the user's account) available for the provision of the requested content. To this end, the OME 200 may run one or more computer applications for evaluating the available devices 206 listed in the database as being part of the user's account. As will be discussed in greater detail below, the aforementioned computer applications running on the OME 200 may also be utilized to evaluate whether one or more "better" or more appropriate platforms exist, such as by taking into consideration various of the aforementioned configuration factors, available bandwidth, and/or bandwidth requirements for each platform. Alternatively (or in conjunction), the evaluation may be based at least in part on the user (e.g., via user-specified rules or preferences).

The present invention recognizes the fact that "best" or "better" may be highly account or user-specific terms, and predicated on an analysis or preference from the user which at all times may not seem rational. For example, a user may specify a preference to watch a smaller/lower resolution monitor, or PC monitor, versus their best quality platform, simply because they enjoy the location of the smaller/less capable monitor better, have other functions they can be performing while watching programs (e.g., it's in the garage, kitchen, laundry room, out by the pool, etc.). As previously noted, templates or rules can also be applied, such that certain preferences are only in effect in certain scenarios, under certain preconditions, at certain times of day, etc. Hence, user-based preferences or inputs (which may also include passively obtained data, such as history of user usage of certain devices, watching certain modes of delivery (e.g., VoD HD versus SD PPV, etc.) may also be used as a component in the "recommendation engine" of the present invention.

Moreover, QoS-based considerations can be used in the evaluation of delivery modes/platforms according to the present invention. For instance, a given delivery channel such as IP-based MPEG-4 encoded content may be delivered over an in-band or DOCSIS QAM in a cable or satellite network, each of which carries with it inherent QoS and FEC requirements. However, the same content may also be streamed over a non-QoS channel (e.g., via the Internet, which has no such QoS/FEC requirements, thereby potentially impacting user experience). Certain users may be amenable to non-QoS delivery in exchange for example time and/or place utility (e.g., so they can watch it on the platform of their choice when they want to watch it).

Cost is yet another factor that may be considered in evaluation of delivery mode/platform. For example, a user may be amenable to watching a lower-quality free version of a given content element or program versus a high-quality "pay" version. This may also be viewed from the network operator's perspective (e.g., the network operator may always opt to deliver the higher-quality "pay" version so as to increase revenue or profit, or seek to deliver the version or via the mode with the least incremental cost (e.g., that is locally cached, or does not use up bandwidth that could be applied to a higher-revenue use).

It is also noted that in certain embodiments of the invention, available alternative delivery platforms may be specified or selected based on the availability of the requested content in an encoded format that is suitable for the platform. For instance, if the content is only available in MPEG2 format, a prospective alternate client device having only an H264 decoder would not be a suitable alternative, and hence would be eliminated from consideration (despite the fact that it may satisfy other optimization goals such as providing better user experience, use less bandwidth (H.264 consumes roughly half the bandwidth of MPEG2), etc.

Accordingly, the present invention further contemplates distinguishing "required" factors from "elective" factors. Required factors might for example include suitable codec support, suitable container decoding support (e.g., MP4 container), suitable transport, suitable QoS support (if required), and so forth. Elective factors might include HD or upconversion capability, QoS support (if QoS is not required), HD audio capability, display monitor size/resolution, "surround sound", recording capability, and so forth. Hence, potential alternative devices can be effectively screened in one embodiment of the invention by first evaluating all of the required factors (for a requested content element and designated delivery mode) against the available devices, and filtering those which do not meet all requirements.

Per step 314, a notification is sent to the user indicating the alternative delivery platforms (e.g., other user devices 206 associated with the user's account), if any, and enabling the user to select individual ones of these platforms for the delivery of the requested content. The user is notified in any number of ways; for example, the notification may be transmitted only to the device 206 on which the user is currently receiving content or has requested content. Alternatively, the notification may be transmitted to all of the client devices 206 associated with the subscriber's account. The notification may intentionally list the recommended devices 206 according to a hierarchy based on the suitability of the device 206 for delivery of the requested content.

The notification in one variant comprises an interactive application which enables the user to select one or more of the given platforms for content delivery. In response to the notification, the user may select to view the content on the requesting client device 206, continue viewing the content on the current client device 206, or the user may select an alternate client device 206 for simultaneous or alternative content provision. In other words, the user may: (i) select to continue or to begin viewing the content on the requesting client device, (ii) may also have the content sent to one or more second client devices, or (iii) or may select to only receive the content on the second client device(s).

In another embodiment, all devices 206 of a given user account are presented as delivery options regardless of their desirability for providing the content. In other words, the user is able to choose, from among all the devices 206 associated with the user account, the devices 206 on which to receive the requested content. These devices can also optionally be ranked; e.g., according to the aforementioned recommendation hierarchy based on the foregoing evaluation, so as to apprise the user of which are the best choices (while also allowing them to see all options). Moreover, those that are incompatible or ineligible for delivery can be so noted (e.g., with an icon, different coloration, etc.).

Once the user's selection(s) are received (step 316), the requested content may be provided to the selected platform(s) at step 318.

The notification may, in another embodiment, be of the type described in co-owned, co-pending U.S. patent application Ser. No. 11/706,620 filed on Feb. 14, 2007 and entitled "Methods and Apparatus for Content Delivery Notification and Management" which is incorporated herein by reference in its entirety. As discussed therein, the notification may offer the user one or more choices, including the choice to either cancel the request or to accept delayed delivery of the requested content on one or more of the available client devices 206. As also discussed therein, if content is requested by the subscriber during a time (or for a time) where the network capacity or bandwidth available for delivery of that content is limited, the notification may alert the subscriber of a potential unavailability of requested content. Similarly, the notification can be made to be dependent on the status of the "target" device(s). For instance, if the user selects a device which is "available" per the billing system, but may not be powered on or connected to the network (and hence not available to receive the data/session associated with the content delivery), then the user of the requesting device will receive notification to this effect, and either allow them to wait or retry after a timeout period, or select another device.

The notification may further provide the subscriber with a projected delivery or availability time for the requested content (either at the requesting client device 206, or at another available device 206). The notification may also allow the subscriber to specify a date and/or time of delivery, such as one convenient to them at any one of the available client devices 206 (e.g., "ten minutes from now"). Still further, the notification may provide the subscriber with a "content/device ready" notification when (i) the content is actually ready for delivery; and/or (ii) the device is ready to accept or display it. The notification may also automatically program or operate the requesting client device 206 or other available client device 206 based on projected or actual delivery information.

Suppose for example, User A registers a PC, a mobile device, a digital set top box (DSTB), and a DVR to the user's account. This information is stored at the database 250, and when User A requests broadcast content on his/her PC (step 302), the OME 200 uses the database 250 to determine that the same content may also be viewed by User A on the other registered devices. The OME 200 evaluates the other features and capabilities of the other registered devices 206 (step 312). Suppose that the evaluation results in the OME 200 determining that the requested broadcast content is better delivered to User A on either his DSTB or recorded on his DVR. Thus, the OME 200 generates and transmits a message to User A informing the user of the "better" delivery options (step 314). User A may then select to receive the content as requested (e.g., at the requesting PC) or may select delivery at one or more of the recommended devices (step 316). For example, User A's selection may result in the requested content being simultaneously or alternatively recorded at User A's registered DVR, and/or may result in a forced "channel" change of User A's registered DSTB (e.g., to a QAM or packet streaming session).

The present invention may be further configured to provide selection of a delivery platform without user intervention (e.g. automatically). For example, the evaluation may give a clearly "best" device 206 for delivery, the delivery may be effected to that device, and the notification merely indicates to the user that the content will be delivered to the "best" device. This can also be subject to user confirmation (e.g., "OK to switch?"), and/or user-based preferences or rules sets (e.g., "never switch from 1080p plasma display to PC").

In another example, a master scheduler may be used. The master scheduler may enable the user to select one or more of the CPE 106 associated with the user's subscriber account for delivery of the requested content. The master scheduler, in one instance, may deny programming to client based on profiles, during certain periods, based on the programming content itself, etc. For example, adult programming may be denied when it is known that the client device is associated to a minor and/or during certain periods. In another instance, the master scheduler can initiate a push of content to certain devices that have storage capabilities. The content push may be based on the content itself, the time of viewing, etc. In another instance, the master schedule is configured to move content from devices around the networks based on specific criteria, local storage maximization, device usage, and/or period usage. For example, the master schedule may assist a user in moving requested content to their vacation home during a vacation, or routing phone calls.

It will also be appreciated that the logic of the method of FIG. 3a may be modified such that it is event-driven; e.g., the powering-up, network access negotiation, and/or logging on of a user device/user may trigger one or more of the foregoing processes. For instance, in one such variant, the startup of a device and establishment of communication with the content delivery network (e.g., via an upstream "startup" message or request for network address, etc.) is used to trigger the OME to evaluate the newly initiated device relative to the extant delivery platform. If the newly initiated device is ranked higher or more optimized for delivery of the content, then a notification will be generated and sent to the user on the current recipient device, apprising them of the prospective "upgrade".

Alternatively, a complete evaluation (such as that described in FIG. 3a, where all associated devices within the subscriber/user account are evaluated) may be performed.

Figure 3B:
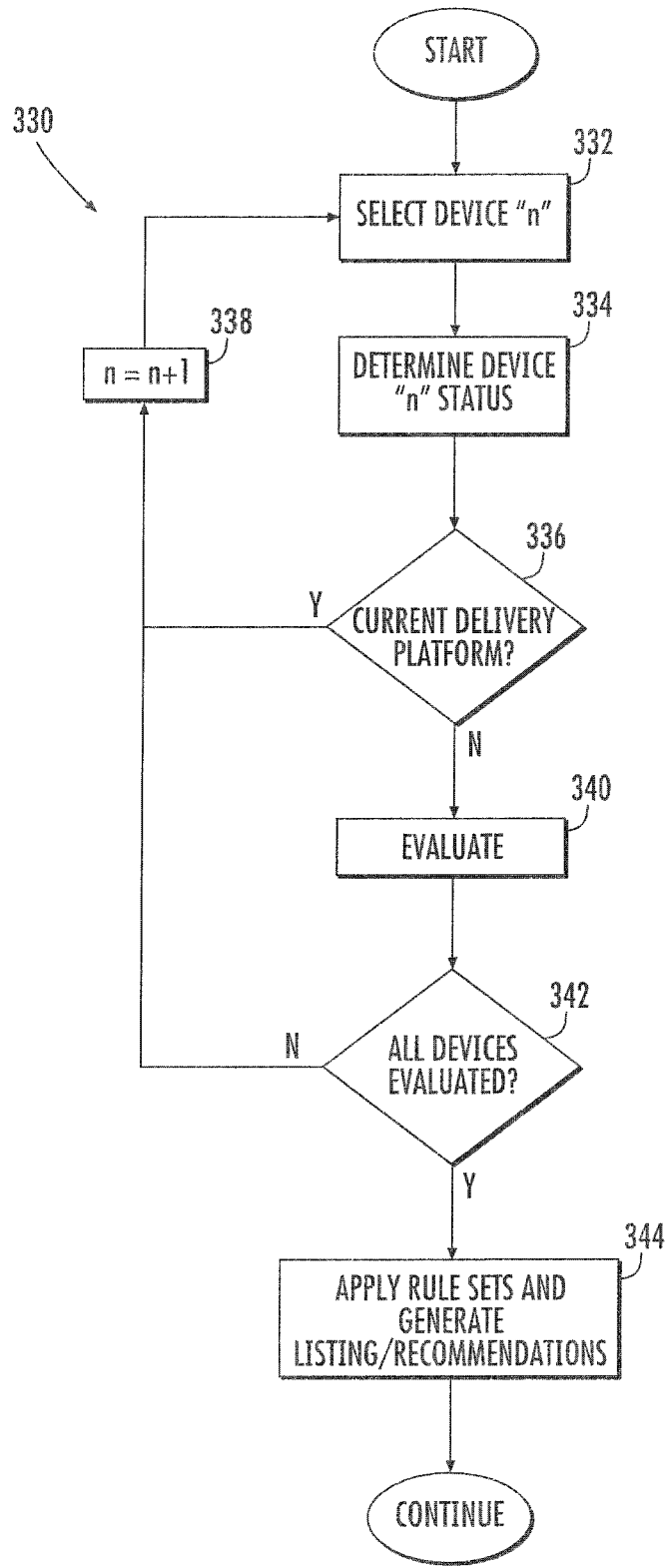
FIG. 3b is a logical flow diagram illustrating one embodiment of a method for monitoring and optimizing content delivery according to the present invention.

Referring now to FIG. 3b, a second embodiment of the method for monitoring and optimizing content delivery in a content delivery network is given.

As shown in FIG. 3b, the method 330 is generally instituted periodically or anecdotally (e.g., upon the occurrence of a prescribed event or sequence of events). In one variant, the OME 200 periodically queries or obtains status on the devices connected to and operable at the premises, and updates an "availability" list based on this status information. For instance, where a PMD is not wirelessly coupled (via e.g., Wi-Fi) to a premises CPD or network, it is considered "inaccessible" even though it may be actively in use. Similarly, if a DSTB does not display a "heartbeat", or is powered off, it may be considered unavailable. Likewise, the failure to generate an appropriate voltage or signal on a pin of a DisplayPort, IEEE-Std. 1394, RJ-45/LAN, or USB interface may indicate a lack of connection.

To this end, a distributed application (DA) with a "server" portion and "client" portion can be utilized. For example, the client portion may be disposed on a network gateway or CPD at the premises, and run so as to periodically poll or determine status of the various registered devices on the premises network. This information is used by the client portion to either (i) generate notifications or recommendations locally at the premises; or (ii) generate a message or signaling upstream to the OME server portion, so that the latter can generate notifications or recommendations.

At step 332 of the method 330, the OME (or its proxy) selects a first device ("n") from a listing of available devices for that premises. This listing may be obtained locally (e.g., at the premises itself, such as one stored on a gateway, CPD, PC, or other device), or via the aforementioned subscriber database.

At step 334, the status of the selected device as a current delivery platform is determined. For instance, in one variant, the OME 200 determines whether content is actively being delivered to that device from the network (e.g., via in-band QAM, IP session, WiMAX transport, etc.). The control and protocol translation server may, in one embodiment be configured to store information relating to what the content currently being sent to any subscriber premises and/or devices associated therewith. The server generates this information based on its role in receiving all of the content request messaging, whether on or off the network, as programmed in the client device or software. The server may then use this information to manage the device states.

In another variant, each of the user's devices can be equipped with a client portion or application which allows the user to "pull" content delivery to that platform.

As previously noted, devices outside the user's premises may also be included within a device listing associated with a given account. For example if User A frequently visits their neighbors down the street (who are not MSO subscribers) and watches movies there, such as every Saturday night, they could add the MAC address or other identifying data associated with their neighbor's CPE (e.g., DSTB) to their account profile. When they arrive at their neighbor's house, the subscriber could log in (i.e., user-based login/password/ security challenge, etc.) via their neighbor's IP-enabled CPE, and then request content from that CPE (e.g., via an IP-based delivery transport such as the Internet, which may even include for example a DOCSIS delivery over another MSG's network).

If the neighbors are also MSO subscribers, but perhaps may not have the same privileges or features (e.g., HBO subscription) at their house, the same logic may be applied, yet delivery of the HBO content may occur, yet via in-band QAM, WiMAX transport, or other MSO-operated delivery infrastructure.

These delivery use cases illustrate the "TV anywhere" concept afforded to MSO subscribers under one embodiment of the present invention.

If the selected device is currently being used to receive content from the network (step 336), this device is marked as "current", and the next device in the listing selected per step 338. If not, then the selected device is evaluated by the OME to determine its capabilities per step 340. The evaluation may be as simple as determining whether the selected device is capable of receiving the requested content (e.g., it may be rendered at a resolution incompatible with the selected device, may be encoded using an incompatible codec or container format, may require more delivery bandwidth than the transport can sustain, may not meet QoS requirements, etc.). However, more sophisticated evaluations may also be conducted (e.g., to characterize the device in various different aspects).

At step 342, it is determined whether the selected device that was evaluated at step 340 was the last device on the listing (i.e., whether all devices associated with the premises or account have been evaluated). If so, then the results of the evaluations, and any templates or user-specified rules sets, are processed by the OME 200 to determine a recommendation/hierarchy per step 344. If not, the additional remaining devices in the listing are processed as above.

In another embodiment of the invention, a user-assigned heuristic regarding the desirability of each device in their listing can be used as the basis of ranking or selection. For instance, a user is on one variant presented with a GUI listing the several devices available at the premises (e.g., HDTV monitor (54 inch), HDTV monitor (32 inch), PC, laptop, and smartphone). The user may specify that it is always most desirable to prioritize the 32-inch monitor, since that is where the user watches most of his/her programs (even though the 54-inch may give a better "user experience" in terms of video and audio quality). However, when the user is not at their premises, the primary desired mode of delivery might be listed as the laptop computer (followed by the smartphone).

Audio aspects can also be considered as part of the evaluation/ranking. For instance, in the context of the foregoing example, one of the HDTV monitors may also include "surround sound" or similar, which greatly enhances the audio aspects of the content presentation. These may be combined with (e.g., according to a weighting function) video aspects of "user experience" as part of the evaluation process.

Session Transfer—

Figure 4:
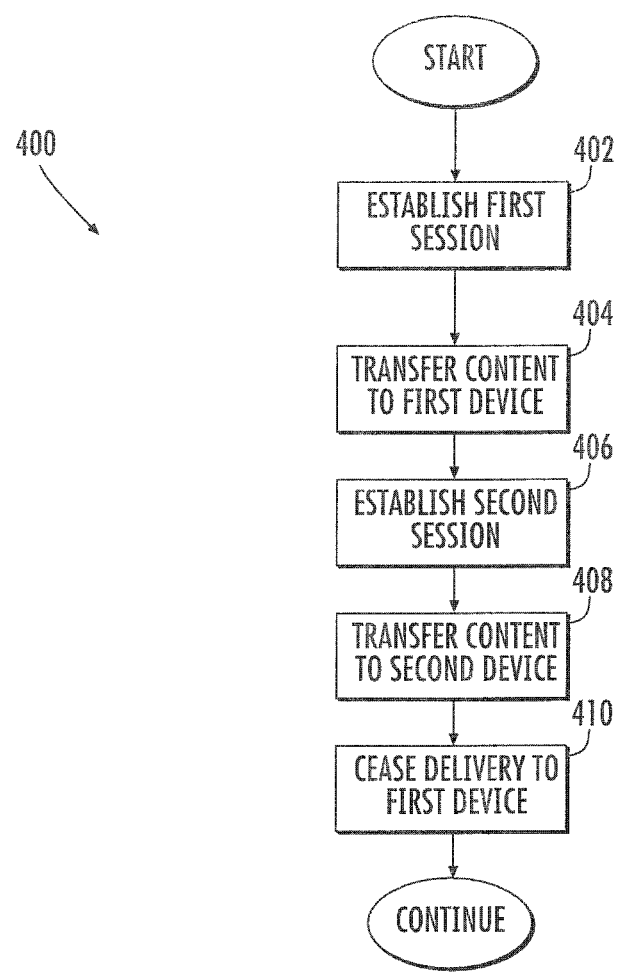
FIG. 4 is a logical flow diagram illustrating one embodiment of a generalized method for inter-device session transfer according to the invention.

Referring now to FIG. 4, one embodiment of a generalized method for managing and transferring content delivery sessions is disclosed. As noted elsewhere herein, one operational scenario in which the present invention may be employed comprises a user having content delivered to a first client device (e.g., DSTB), and then wanting to transfer that content "mid stream" (and in some cases without significant loss or discontinuity) to another client device, such as pursuant to a notification/recommendation from the OME. One approach for effecting this transfer would be to simply have the user power-on the target (transferee) device, and then tune or switch that device to the appropriate delivery channel, and then subsequently switch off the transferor (original) device. However, this approach is far from elegant, and does not optimize user experience in that the foregoing switch may take time and result in loss of content (especially where the content being delivered is linear or broadcast).

Accordingly, the improved methods and apparatus of the present invention seek to provide a substantially seamless mechanism for such transfers. In one embodiment, an extant session (e.g., SIP session between a content delivery server and the first client device (transferor)) is maintained and modified to add the transferee device, with subsequent removal of the transferor device from the session. As described elsewhere herein, "state" information may optionally be utilized consistent with this approach in order to allow for transfer without significant discontinuity, even where the transferee device is not yet powered up or available.

As shown in FIG. 4, the first step of the method 400 comprises establishing a communication session between a content source and a first recipient device (transferor) using a session-based protocol adapted for use on a packet-switched network, e.g., SIP (step 402). Content is then transferred to the first recipient device within the session, such as via an RTP stream per step 404. Next, a communication session is established between said content source and a second recipient device (e.g., transferee) per step 406, and delivery of the content to the second recipient device is commenced per step 408. This may be pursuant for example to a notification/recommendation generated by the OME as described elsewhere herein; e.g., that the transferee device is somehow "better" or more optimal for delivery of content at that point in time.

Delivery of content to the first device may then be ceased as desired (step 410).

It is noted that in step 406, the session established between the content source and the second recipient device may be the same or a different session than that established in step 402 with the first device; e.g., a SIP session can advantageously have multiple participants within the same "session" (e.g., via conferencing), and hence deliver a given content stream to multiple endpoints, although such use of a unified session is by no means a requirement of the invention.

For instance, in one implementation of the method 400, the content source comprises an IP TV (Internet Protocol television) server disposed within a content delivery network (e.g., a satellite or Hybrid Fiber coaxial (HFC) cable television network, and the packetized content is delivered according to a unicast session via one or more DOCSIS or other QAM channels). In one embodiment, live content is also delivered via a multicast delivery system. If the consuming device capabilities do not align, more than one multicast may be initiated. In some instances, this has the desired effect of improving the efficiency of the delivery mechanism when more than one customer requests a stream in the same service group, and entails little penalty in terms of bandwidth even when only one device is consuming the stream.

The aforementioned method may also be performed automatically (i.e., without substantial user intervention) if desired. For instance, once a notification of a prospective "upgrade" is sent to the user, if the user opts to accept the upgrade, the foregoing transfer can be automatically invoked without further user action.

Figure 4A:
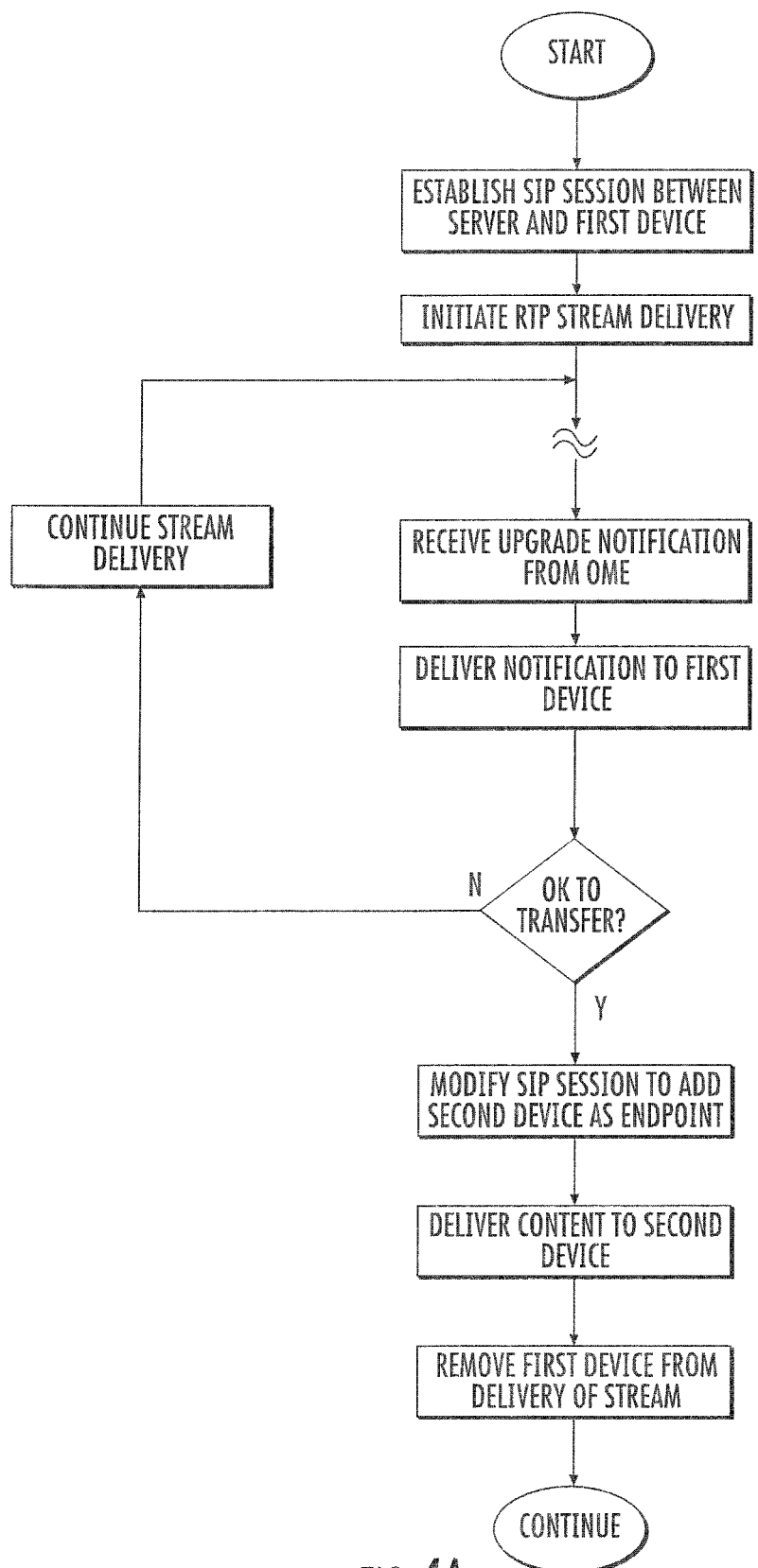
FIG. 4a is a logical flow diagram illustrating one SIP-based implementation of the generalized method of FIG. 4.

FIG. 4a illustrates one implementation of the generalized method of FIG. 4, wherein a SIP session and RTP stream (with QoS) are used in conjunction with an IPTV server (e.g., MPEG2 or MPEG4 encoded content packetized via the IP protocol and delivered via TCP transport over a PHY such as MPEG2 transport stream, etc.). The native SIP methods (e.g., INVITE, etc.) are used to establish what amounts to an RTP stream multicast to the two delivery devices (i.e., transferor and transferee) in parallel for at least a period of time, and then delivery to the first device ceased, if/when desired.

Moreover, various techniques can be invoked and used within the foregoing methods so as to avoid loss of "state" of the delivered content. For example, where the content delivery mechanism within the first session is non-linear (e.g., VoD, nPVR, or similar), a simple command or signal to the content delivery server to pause the stream can be used, thereby preventing any loss of content from the user's perspective. In cases of linear content delivery (e.g., live broadcast), a network- or premises-based recording function can be invoked, such as where a network DVR or premises DVR function is messaged to start recording the stream from a prescribed timing coordinate, packet ID, or cue until the second session is established or the user affirmatively allows content delivery via the second session (e.g., selects an "OK" function on the second device, thereby allowing for continued content delivery).

In yet another implementation, the linear packet stream can simply be buffered (e.g., at the server, such as in a FIFO buffer sized appropriately for a suitable transition time), and the buffer contents read out when the second session has been established and the user has OK'd further delivery.

It is appreciated that the foregoing functionality may be implemented according to any number of different network architectures. For example the well known IMS (IP Multimedia Subsystem) associated with 3GPP and other relevant standards can be used as a basis for the foregoing SIP sessions and functions. IMS is particularly designed with a common control plane architecture which advantageously facilitates "blending" of control functions of services and applications, such as is described in U.S. provisional patent application Ser. No. 61/256,903 entitled "METHODS AND APPARATUS FOR PACKETIZED CONTENT DELIVERY OVER A CONTENT DELIVERY NETWORK, previously incorporated herein. This technology is particularly useful in cross-network (e.g., off-net to on-net, and vice versa) transfers of sessions such as those contemplated by the present invention, since the common control plane architecture allows for handover of the session across network boundaries. For example, in one such scenario, a user may wish to transfer an extant "broadcast" session delivered over say a cable or satellite or HFCu network to a cellular, WiMAX, or FLO (Forward Link Only)-enabled handset or mobile device, such as when the user is leaving their premises but wishes to keep watching a given program. By instantiating delivery of the broadcast/linear over say a SIP session to the premises device, and then transferring the session to the handset (and hence delivering the packetized media stream over the IMS infrastructure off-net), the user can experience a seamless handoff to the handset, which will then receive the packet stream via the designated wireless infrastructure (e.g., UMTS/3G, WiMAX, FLO, etc.), yet which is still originated from the MSO network sources. In this fashion, MSO-derived content (which may come from off-net sources itself, such as the Internet) can be delivered to MSO subscribers both on-net and off-net, and switching back and forth is easily accomplished.

Optimization and Monitoring Entity—

Figure 5:
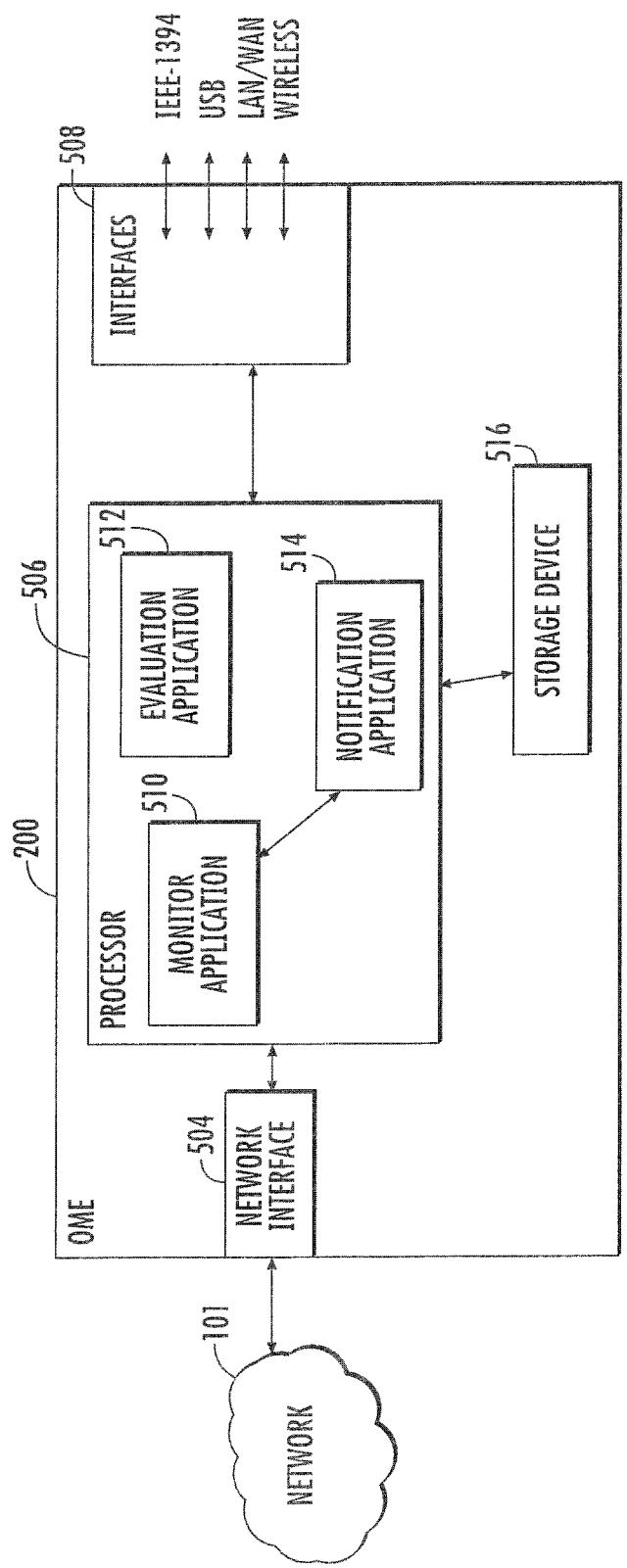
FIG. 5 is a functional block diagram illustrating one embodiment of a optimizing and monitoring entity (OME) according to the present invention.

Referring to FIG. 5; an exemplary embodiment of the OME apparatus 200 is illustrated. As shown, the OME 200 generally comprises a network interface 504, a processor 506 having associated storage 516, and a plurality of back end interfaces 508. Other components which may be utilized within the OME 200 include amplifiers, board level electronic components, as well as media processors and other specialized SoC or ASIC devices (not shown). Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the OME 200 and the client devices 206.

The network interface 504 enables direct or indirect communication between the OME 200 and various entities of the network 101, such as e.g., the client devices 206. It is noted that the network interface 504 may comprise a plurality of interfaces for use with other network apparatus such as RF combiners, IP routers and other packet network devices, network management and provisioning systems, local PCs, etc. The interface 504 may be e.g., an IEEE-1394 interface, a USB interface, a LAN interface, an ASI/GBE interface, wireless (e.g., WiMAX) etc.

The back end interfaces 508 comprise a plurality of interfaces (e.g., IEEE-1394, USB, LAN/WAN, Wireless, etc.) which facilitate communication between the OME 200 and other network devices, such as those in the BPS 202 (e.g., the server 201 and database 205). The back end interfaces 508 may also facilitate communication with other devices (not shown) in the BPS 202 or elsewhere in the network 101 as needed, such as other management processes.

The processor 506 is configured to run a monitoring application 510, an evaluation application 512 and a notification application 514 thereon. In the illustrated embodiment, each of these applications 510, 512, 514 work in conjunction with one another and with the BPS 202 entities to determine, evaluate, and provide notification of one or more alternative content delivery platforms, each of the applications 510, 512, 514 will be described in turn herein below.

The monitoring application 510 running on the OME 200 monitors the devices 206 receiving content by communicating with the server 201 to receive copies of content requests which were sent to the server 201 from the client devices 206. In other words, as a client device 206 requests content from the server 201, the request is copied and forwarded to the OME 200. Other schemes may be used as well, however, such as where the content requests are routed through the OME first and forwarded to the server, delivered in parallel, or one entity signals the other without copying or forwarding the request (which may include extraction of relevant information, and creation of a separate message in the appropriate format for inter-process communication between the entities).

The monitoring application 510 uses information in the content requests to identify the client device 206 requesting content and to identify the subscriber account associated with the client device 206. For example, the content requests may contain a unique device identifier (such as e.g., IP address, MAC address, digital signature (e.g., hash or residue, etc.); the content requests may further contain information identifying a subscriber account (such as e.g., subscriber account number, subscriber address, login and password combination, secret image or challenge question information, etc.).

In the event that only the device 206 identification is provided in the content request, the monitoring application 510 will determine the subscriber account with which the device 206 is associated (if any). In one embodiment, the monitoring application 510 will do so by querying the device description records 254 stored at the database 250 to find a subscriber account association (e.g., to find the subscriber account record 252 linked thereto). In another embodiment, the monitoring application 510 may query the billing system 204 to find an association of the given device 206 to a particular subscriber account.

Once the monitoring application 510 identifies the device 206 and its associated subscriber account, the application passes this information to either the notification application 514, or the evaluation application 512, or both. If the information is passed directly to the notification application 514, the application 514 simply generates notices to the subscriber indicating all of the devices 206 which are available. If the information is passed to the evaluation application 512, the application 512 determines whether any of the available devices 206 is a "better" or more appropriate platform for the delivery of the requested content, and makes a recommendation. The recommendation is then forwarded to the notification application 514 so that a notice may be sent to the user reflecting the information generated by the evaluation application 512 (e.g., a hierarchical ranking of options, deletion of those not meeting a specified criterion or level of service "quality", etc.).

The evaluation application 512 running on the processor 506 of the OME 200 comprises one or more computer programs adapted to evaluate content delivery modes/platforms, once it is determined one or more client devices 206 are available for delivery of the requested content (e.g., are registered to the same account as the requesting device 206) As previously discussed, the application 512 may also include a "recommendation engine" which recommends one or more for alternative and/or additional delivery of the requested content. In other words, in the exemplary embodiment, the monitoring application 510 determines all of the devices 206 in the subscriber's account, and forwards this information to the evaluation application 512. The evaluation application 512 evaluates each of the available devices based on one or more criteria, and provides a list or other means of indicating one or more delivery platforms which are deemed to be appropriate for the delivery of the requested content (or more appropriate than the requesting device 206). It is noted, however, that in alternate embodiments, the monitoring application 510 may pre-process or filter the list of "available" devices before sending this information to the evaluation application, such as where the monitoring application determines the state of each device associated with a user (or account), and filters them based on lack of accessibility. Devices may also be arranged by the monitoring application by tier or classification; e.g., currently powered-on versus powered-down devices, HD-capable versus non-HD capable devices, fixed versus mobile devices, etc. This may be accomplished based on configuration information contained within the subscriber/device database, via a query to each device (or monitoring some aspect of device operation, such as a periodic heartbeat), query to the user for device status, or any combination of the foregoing, as described in greater detail subsequently herein.

As noted above, the appropriateness of a content delivery device 206 may be determined based on one or more of a variety of criteria, including without limitation: (i) device availability/current status; (ii) capabilities (e.g., hardware/software configuration); (iii) cost implications to the user; (iv) cost/revenue implications to the network operator; (iv) picture/audio quality and "user experience"; (v) network parameters/limitations (e.g., bandwidth, need to instantiate a new session or QAM for delivery, etc.); and/or (vi) user preferences and/or "templates" provided by the user. For example, the evaluation application 512 may be configured to evaluate each of the devices based on bandwidth requirements/availability. In one embodiment, the apparatus and methods disclosed in co-owned, co-pending U.S. patent application Ser. No. 11/243,720 filed on Oct. 4, 2005 and entitled "Self-Monitoring and Optimizing Network Apparatus and Methods", incorporated herein by reference in its entirety, may be used by the evaluation application 512 to recommend devices 206 for optimized content delivery. As discussed therein, the evaluation application 512 may employ a substantially automated and anticipatory mechanism whereby a content delivery network, such as a broadcast switched architecture (BSA) network, can effectively "self-monitor" and optimize its bandwidth allocation based on, inter alia, data received from the receivers (e.g., DSTBs) within its service area, or from the network as a whole. The evaluation application 512 analyzes information gathered from the devices 206 (as well as optionally other information relating to, e.g., the network itself or other historical periods) to determine the expected statistical variations of the system as a function of time and various events (e.g., holidays), and the expected statistical viewing behavior of known future details of the offered content, in effect allowing it to predict subscriber behavior and make adjustments to the operational parameters of the network based on these predictions.

As another example, the methods and apparatus of co-owned co-pending U.S. patent application Ser. No. 11/881,034 filed on Jul. 24, 2007 and entitled "Methods and Apparatus for Format Selection for Network Optimization", incorporated herein by reference in its entirety, may be utilized to determine which devices of a subscriber's available devices would be best suited for providing optimized content delivery. Accordingly, the evaluation application 512 may be configured to evaluate and recommend devices 206 for content delivery which minimize bandwidth consumption while also maximizing subscriber satisfaction and service level (e.g., video and/or audio quality).

The evaluation application 512 may also take into account what is known about the devices 206 (e.g., HD capabilities, MPEG2 or MPEG4 decoding capabilities, etc.) to determine which devices should be recommended (or how the multiple devices should be ranked). For example, if it is known that a group of user devices 206 in a service area are HD-capable, then the evaluation application 512 may recommend a user utilize the ones of the user's devices 206 which are HD capable, thus enabling these devices 206 to tune to any available HD versions of programs to reduce the instances of duplicate programming, and to satisfy SD programming requests using HD programming. Conversely, in times of constrained bandwidth, the evaluation application 512 may recommend only SD capable devices (and/or not recommend HD devices) 206 so that an SD version of a program (or a lower bitrate stream of the HD program) may be delivered, including during instances where an HD program is requested. The evaluation application 512 may further take into account whether particular ones of the user's available devices 206 have up-conversion capability, in which the user may still advantageously experience substantially "HD-quality" video, even though the device 206 input has been switched to SD, and may recommend these devices in instances of constrained bandwidth.

The evaluation application 512 may also evaluate the devices 206 identified by the monitoring application 510 as being within the subscriber's account, and make recommendations based at least in part on what is known about the user. For example, the evaluation application 512 may be configured to record information regarding the viewing habits of the subscriber with respect to the one or more devices 206 held within the subscriber's account, and utilize this information to recommend (based on the type of content requested and/or the requesting device 206), other platforms for delivery of the content, and/or other content for delivery on the requesting device 206.

Suppose for example, that previous (historical) viewing patterns for User A indicate that User A enjoys viewing broadcast or "linear" content the vast majority of the time on his in-home DSTB. Accordingly, when a request is received from User A from a mobile device for broadcast content, the evaluation application 512 may utilize the historical information to determine that it is possible that User A would prefer to view the content on his DSTB (or record the content on his premises DVR for later viewing), and may therefore recommend this device to User A. In addition, the evaluation application 512 may, based on the aforementioned viewing patterns, recommend content similar to the content being requested (and which is in a compatible format) for viewing by User A on the mobile device.

The aforementioned historical data collection and storage may be provided using e.g., the methods and apparatus disclosed in co-owned, co-pending U.S. patent application Ser. No. 11/243,720 filed on Oct. 4, 2005 and entitled "Self-Monitoring and Optimizing Network Apparatus and Methods", previously incorporated herein.

The aforementioned embodiment of the evaluation application 512, wherein it recommends alternative delivery platforms (e.g., alternate devices 206 associated with the user's account) based at least in part on the capabilities of the various devices 206 available to the user, may be configured to obtain the device capabilities via a variety of mechanisms. For instance, a device profile defining the various features and capabilities (including content decoding capabilities, security features, etc.) of the devices 206 may be transmitted to the network (e.g., the billing system 204, the OME 200, or a storage entity in communication with either located at the BPS 202 or elsewhere at the headend 150) from each client device 206. These device profiles may be part of a content request (e.g. as part of a message payload, metadata, etc.), or sent as a separate communication, and may be of a standardized format as well, thereby facilitating ingestion into the network. These profiles may be periodically or anecdotally updated as well, such as via a "push" from the CPE to the network (e.g., upon startup), or a "pull" from the network (e.g., a request sent from the OME or other network entity to the CPE when an update is required). In one embodiment, the methods and apparatus disclosed in co-owned, co-pending U.S. patent application Ser. No. 11/904,408 filed on Sep. 26, 2007 and entitled "Methods and Apparatus for Device Capabilities Discovery and Utilization Within a Content delivery Network", which is incorporated herein by reference in its entirety, are used. This disclosure describes inter alia apparatus and methods for determining and selecting digital coding and/or decoding technology, delivery bitrates, and resolution parameters for programming and data delivery over, e.g., a content delivery network. Hardware and software functions/modules of the different devices 206 on the network contain various capabilities and options, including conditional access capabilities, video coding or compression capabilities, encryption schema, and network interfaces. These are transmitted to a headend entity (e.g., the OME 200) in the form of a capabilities profile for analysis. The headend entity determines the one or more capabilities possessed by client devices 206, and evaluates one or more program or content choices for possible delivery to each of the devices 206 based on its profile. In the context of the present invention, the evaluation application 512 may evaluate the device capabilities discussed above when making device rankings or recommendations. The evaluation application 512 may further take into consideration network and/or device operational considerations, such as conservation of downstream bandwidth, device uprating capability, client device power consumption, and the like according to this embodiment, as discussed elsewhere herein.

In another embodiment, the client device 206 capabilities may be derived exclusively from the OME 200, billing system 204, or other headend entity. For example, when a user registers a device 206 to the billing system 204 (and information regarding the device 206 is stored at the subscriber device database 250), the billing system 204 and/or OME 200 may utilize information identifying the device (such as the IP address, MAC address, etc.) to generate a device description record 256 (as shown in FIG. 2c) which is associated to the particular device description record 254 in the database 250. In other words, the OME 200 and/or billing system 204 (or other entity) at the time a device 206 is registered may generate capabilities information regarding the device (based on information obtained during registration) in order to generate a device description record 256.

The evaluation application 512, in another embodiment, may utilize the MAC address associated with the requesting devices 206 and received by the OME 200 as a part of a content request to determine recommendations. The OME 200, upon receiving the MAC address, may identify a portion of the address (such as e.g., the organizationally unique identifier or OUT) as indicative of the type of device requesting access to content. The OME 200 may utilize this information to determine the precise one of a subscriber's devices which is requesting content, and recommend an alternative delivery platform based thereon (e.g., based on another device with similar capabilities/configuration profile). For example, suppose the OUI of the MAC address of the requesting device indicates that the device is manufactured by Scientific Atlanta, and also that a subscriber has registered a Dell PC, a Motorola MR-DVR, an Apple laptop computer, and a Scientific Atlanta STB within their MSO account. The OME 200 is configured to deduce that the requesting device is the STB based on the MAC address OUI (indicating Scientific Atlanta). The evaluation application 512 may then determine whether to recommend either of the other devices in the subscriber's accounts as indicated above, such as based on comparable capabilities (e.g., the Motorola MR-DVR may be comparable in capabilities or configuration as far as content delivery is concerned, and hence may be a viable candidate). In this regard, the MAC address may also feasibly be used to determine device configuration. For example, part of the MAC address or range of values may correspond to a known device type or family from the manufacturer associated with the OUI (i.e., the OUI indicates a Scientific Atlanta STB, and a second portion of the MAC indicates a 3250-family device). The evaluation application 512 can then pull a pre-stored template (or obtain one from a third party, such as Scientific Atlanta) indicating generally the capabilities of the requesting device. The evaluation application 512 can then determine if any of the other devices in the subscriber's account have similar or sufficient capabilities with respect to one or more predetermined attributes.

The recommendations made by the evaluation application 512 are in one embodiment provided to users via notices generated by the notification application 514.

The notification application 514 running on the OME 200 generates and provides notifications to the client devices 206 indicating which, if any, of the user's other devices 206 may receive the content alternatively (or in addition) to the content being received at the requesting device 206. The notification application 514 receives information from the monitor application 510 and/or the evaluation application 512 indicating one or more devices in a subscriber's network which are capable of displaying the requested content (or which represent an improvement or "upgrade"). The notification application 514 compiles this information into one or more notices. The notices may be delivered only to the requesting device 206, to only active or communicate devices within the user's account, or all of the devices 206 which are identified as being a member of the requesting user's account (whether currently active or not).

The notifications generated by the notification application 514 are, in one embodiment, interactive in nature. For example, the notifications may be adapted to enable the user to select one or more of the presented content delivery platforms. Suppose for example, that the notification application 514 generates a notification listing the user's requesting device 206, as well as a DVR 226 and STB 222 as other devices in the user's network. The user may then select to continue (or begin) viewing the requested content on the requesting device 206, as well as optionally select to have the content delivered to either or both the DVR 226 and STB 222 (or one of those devices, and not the requesting device 206).

As indicated above, the notification may, in one embodiment, be of the type described in co-owned, co-pending U.S. patent application Ser. No. 11/706,620 entitled "Methods and Apparatus for Content Delivery Notification and Management" previously incorporated herein. As discussed therein, the notification application 514 may generate notifications which enable users one or more choices, such as, choosing the delivery platform, scheduling delayed delivery, canceling a request, etc. Further, the notification application 514 may work in conjunction with the monitoring application 510 to determine whether the network has capacity or bandwidth available to service the request at each of the user's devices, and may generate notifications which alert the subscriber of a potential unavailability of requested content on various ones of these devices 206.

The notifications generated by the notification application 514 may further provide a projected delivery or availability time for the requested content (either at the requesting client device 206, or at another available device).

It is further appreciated that a master scheduler application (not shown) may also be run on the processor 506 of the OME 200. The master scheduler application enables the user to select one or more of the CPE 106 associated with the user's subscriber account for delivery of the requested content, and schedule delivery of content thereto (as discussed above). In one embodiment, the master scheduler functionality is included within the aforementioned notification application 514, which is configured to receive and process delivery scheduling commands or input, thereby enabling a user to enter a specific date and/or time for delivery of content for individual ones of the available client devices 206. For example, the user may be able to specify delivery of certain content to their DSTB/HDTV in the living room from 8:00 pm to 11:00 pm, and then at their second receiver/smaller monitor in the bedroom from 11:00 pm through 8:00 am. As described elsewhere herein, an extant content delivery session may also be moved seamlessly between the two environments, such as by e.g., adding the second device to an existing IP unicast or multicast, and then removing the first device at the prescribed time (e.g., via SIP multi-party "conferencing" or similar protocols).

State Information—

In one embodiment, a network entity (e.g., a REST search/recommendation entity such as that described in U.S. provisional patent application Ser. No. 61/256,903 entitled "METHODS AND APPARATUS FOR PACKETIZED CONTENT DELIVERY OVER A CONTENT DELIVERY NETWORK, previously incorporated herein) may be utilized to provide state transfer capabilities between devices. As used herein, the term "state" refers without limitation to the status, temporal, or other context associated with one or more content elements. For example, the aforementioned exemplary REST search/recommendation entity enables a user to "book mark" content at a first device, and have the content moved to a different place in the premises and/or a different device. In other words, the state of the content at the first device is identified and transferred (as metadata) along with the content, to a second device. The second device may then begin playback of the content according to the state identified in the metadata. Other states may be transferred as well including e.g., a pause, StartOver, etc. function. The state transfer capabilities may be automatic (such as upon teardown) and/or subject to user request. The above-disclosed state transfer capabilities may be affected via a uniform user interface (present on each of the devices) and enable content state transfer across multiple, different platforms.

In one embodiment, the general state transfer concepts are of the type discussed in co-owned U.S. Pat. No. 7,486,869 issued Feb. 3, 2009 and entitled "System And Method For Controlling A Digital Video Recorder On A Cable Network", which is incorporated herein by reference in its entirety. As discussed therein, signaling associated with the answering or initiation of a digital telephone call by a digital telephone subscriber is used to issue commands to a digital video recorder (DVR). For example, a signal is generated by a first device at a first event (such as e.g., a signal is generated when a telephone is enters an "off-hook" state), the signal is sent to a second device indicating the event (such as e.g., a DVR). In response to receiving the signal, the second device takes some action with respect to content (e.g., pausing or initiating a recording of the content at the DVR). A second signal received from the first device may, in one embodiment, be generated on the happening of a second event, transferred to the second device and cause a second response at the second device. The aforementioned state messages may be sent over an out-of-band channel/path between the devices.

In another embodiment, the aforementioned state transfer capabilities may be utilized to provide state transfer operations between legacy devices and IP capable devices by e.g., utilizing a VOD mechanism to move a state message there between. Various other approaches may be used as well consistent with the present information.

Client Device Implementations—

Figure 6:
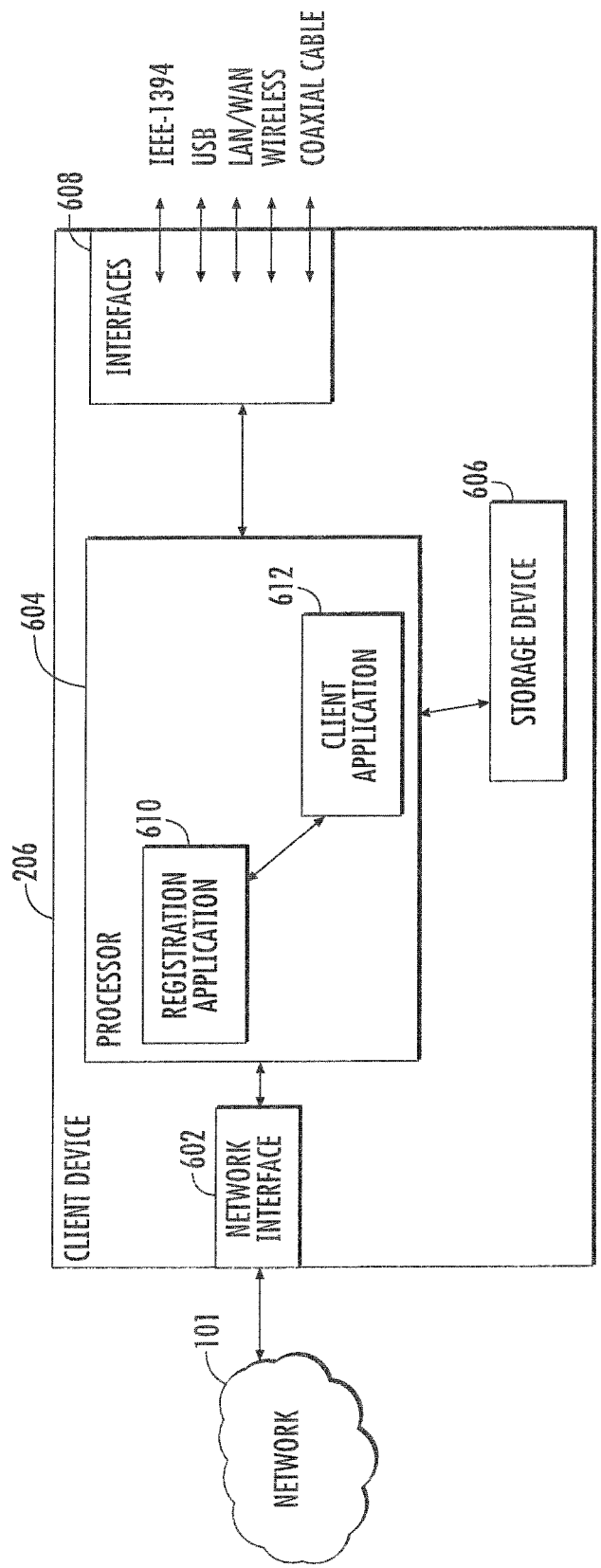
FIG. 6 is a functional block diagram illustrating one embodiment of a consumer or client device for use in the present invention.

Referring now to FIG. 6, an exemplary implementation of a client device 206 is given. The exemplary client device 206 includes a network interface 602, a processor 604 and associated storage 606, and a plurality of back end interfaces 608 for communication with other devices. As discussed above with respect to FIGS. 1-1d and 2-2b, the client devices 206 may comprise any number of device types including, for example, CPE 106 (such as DSTB, MB, CPD, etc.), PVR, DVR, network DVR, computer devices (such as PC and laptop computers), and mobile devices (including PMD and mobile telephones). The device 206 of FIG. 6 is intended to represent the features of each of the aforementioned devices generally, and any design or configuration changes between the various types of devices will be readily appreciated by those of ordinary skill given the present disclosure.

The illustrated client device 206 can assume literally any discrete form factor, including those adapted for desktop, floor-standing, or wall-mounted use, or alternatively may be integrated in whole or part (e.g., on a common functional basis) with other devices if desired.

It will also be recognized that the device configuration shown is essentially for illustrative purposes, and various other configurations of the client devices 206 are consistent with other embodiments of the invention. For example, the device 206 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

The network interface 602 of the illustrated client device 206 receives content and/or data from the content distribution network (e.g., HFC, HFCu, satellite, etc. network 101). In one embodiment, the network interface 602 may comprise a traditional video RF front end (e.g., tuner) adapted to receive video signals over, e.g., one or more QAMs. For example, the RF front end may comprise one or more tuners, a demodulator, decryption module, and demultiplexer of the type well known in the art, although other configurations may be used. A wideband tuner arrangement such as that described in co-owned and co-pending U.S. patent application Ser. No. 11/013,671 entitled "Method and Apparatus for Wideband Distribution of Content" filed Dec. 15, 2004 and incorporated herein by reference in its entirety, may also be utilized, such as where the content associated with one or more program streams is distributed across two or more QAMs. The network interface 602 may, alternatively comprise any number of a mechanisms for the receipt of content and/or data.

Additionally, the network interface 602 modulates, encrypts/multiplexes as required, and transmits digital information for receipt by upstream entities such as the CMTS or a network server. Programming data may also be stored on the device storage unit 606 (discussed below) for later distribution by way of the video interface, or using a Wi-Fi interface, Ethernet interface, FireWire (IEEE Std 1394), USB/USB2, or any number of other such options.

The network interface 602 may further comprise a cable modem (CM) of the type known in the art. In this fashion, and content or data normally streamed over the CM can be received and distributed by the client device 206, such as for example packetized video (e.g., IPTV) or broadband Internet data.

Programming and other types of data including pictures, video, music or MP3 files, software applications, metadata files, etc. may also be received by way of the various digital interfaces in the client device 206. These data may be stored locally (e.g., in the storage unit 606) or even on a device or network agent in communication with the client device 606, for later use by a user as is discussed in co-owned co-pending U.S. patent application Ser. No. 11/378,129 filed Mar. 16, 2006 and entitled "METHODS AND APPARATUS FOR CENTRALIZED CONTENT AND DATA DELIVERY", previously incorporated herein by reference in its entirety. As discussed therein, a user may receive a video, JPEG, etc. MP3 file, from a friend's smartphone or PMD, which can then be "pushed" to a corresponding interface on the client device 206, wherein the data is stored on the mass storage device 606. Similarly, video data from a connected DVD player/burner might be streamed from the player to the device 206 for storage thereon (or distribution via yet another interface, such as via the Ethernet interface to another client device 206).

The mass storage device 606 of the illustrated embodiment comprises a Serial-ATA (SATA) or Ultra-ATA (also known as Ultra-DMA, or ATA-4/5/6/7) hard disk drive for the operating system and content storage of at least 300 GB, although higher capacities and even RAID arrays may be used for this purpose.

A registration application 610 (located in the storage unit 606 or program memory) is run on the processor 604 of the client device 206. The registration application 610 is utilized by the client device 206 to provide information regarding the device and the subscriber to the OME 200 and/or billing system 204. In one embodiment, the device 206 identifier (e.g., MAC address) is manually entered by a technician or other MSO personnel. For example, the user may, via telephone, email, text message, etc. give an operator a MAC address to be added to his/her account. Alternatively, a technician may connect the device 206 to the user's premises and facilitate its addition to the user's account (e.g., via a service call) using the registration application 610. In another embodiment, when a user plugs a client device 206 into an existing home or premises network, a series of communications automatically occur between the added device 206 and one or more headend 150 entities (such as the OME 200 and/or billing system 204) resulting in the registration of the device 206 to the user's account without requiring a substantial user, operator and/or technician action or intervention.

The client device 206 is further configured to run a client application 612 thereon (which may be integrated with the aforementioned registration application, or other applications of the CPE if desired). The client application 612 enables the device 206 to receive and display notifications from the notification application 514, and also enables the user of the device to interact with the notifications. The client application 612 may be further configured to analyze the client device 206 capabilities, and report these to the OME 200 for storage in the database 250 as device description records 256, as described elsewhere herein.

In another implementation (not shown), content and/or data may be distributed to the client devices 206 via Worldwide Interoperability for Microwave Access (WiMAX) transport; see IEEE Std. 802.16e-2005 entitled "IEEE Standard for Local and metropolitan area networks—Part 16: Air Interface for Fixed and Mobile—Broadband Wireless Access Systems Amendment 2: Physical and Medium Access Control Layers for Combined Fixed and Mobile Operation in Licensed Bands", which is incorporated herein by reference in its entirety. For example, multiple WiMAX base stations may be established by the MSO or other content provider. One or more of the WiMAX stations transmit programming or other content and/or data to the client devices 206 (which may include simultaneously, so as to ensure a robust signal is received and to potentially support any QoS requirements). In one embodiment, a client device 206 may transmit registration information out-of-band data via WiMAX transport. In this fashion, the WiMAX transport acts as a wireless data "pipe" in parallel to the normal DOCSIS or in-band RF channels (e.g., QAMs) transmitted over the cable or satellite distribution network.

In the context of the present invention for example, the client device 206 might transmit content requests via the cable network to the server 201 (which are subsequently passed to the OME 200), yet receive requested content (at the requesting device and/or at a second device) via the WIMAX broadband interface. Alternatively, the WiMAX interface could be used to transmit the requests to the server 201 (via a WiMAX interface associated with the latter), with delivery of the requested content being via in-band or DOCSIS RF QAMs. The aforementioned WiMAX interface may also be utilized by the client device 206 and/or the OME 200 and billing system 204 during the registration process. Various other permutations of the foregoing will be recognized by those of ordinary skill given the present disclosure.

User Interface—

In another aspect of the invention, a substantially centralized user interface and control device is disclosed which permits the transfer or migration of content delivery sessions (e.g., SIP-based IPTV sessions or the like) between two or more devices. In one implementation, the user's premises gateway or DSTB and associated display device, or PC, is used as the host (control) device for the user interface, the latter which shows the various premises and "off-net" devices associated with the user/subscriber account, and their interconnectivity (i.e., which devices are currently in communication with others via wired or wireless interfaces, etc.).

For example, "on-net" devices might include the user's premises gateway or CPD, DSTB, DVR, WiMAX-enabled receiver, HDTV, etc., while "off net" devices might include the user's Wi-Fi-enabled laptop or smartphone, cellular smartphone (which may be the same device as the former), PMD, etc. As used herein, the terms "on-net" and "off-net" are used merely to highlight the difference between services or delivery modes provided by the MSO and those provided by an outside or third-party operator (e.g., cellular service provider or wireless service provider), although these terms are by no means determinative, and in fact devices can switch hosting (e.g., go from on-net to off-net, and vice versa), or be multi-functioned. For example, a WiMAX-enabled portable receiver may be serviced by the MSO infrastructure for delivery of MSO content as described elsewhere herein, or be serviced by a separate wireless service provider not associated with the MSO, or both.

In one variant, the control device includes a GUI functionality (e.g., a multi-touch-screen GUI, drag-and-drop, speech recognition application, or other interface/input device) allows the user to rapidly designate particular devices for establishment of a session/delivery of content, and/or transfer existing communication sessions between capable devices (such as may be determined by the OME recommendation engine). Remote control devices associated with extant devices such as DVRs, DSTBs, etc. can for example be modified to include the foregoing UI/GUI functionality, or a separate dedicated device provided.

In another variant, a separate centrally located "always on" device with touch screen functionality is provided, so that the user can see the status and connectivity of all devices, and control the transfer of content delivery sessions via the device. For example, the UI shows all devices in premises, and touch screen and "drag and drop" functionality allows the user to select an icon associated with a given device with an active content delivery (e.g., SIP) session, and literally drag their finger to the icon of a second (and/or third) device desired to receive the content. This drag and drop function will then be treated as the user "OK" to transfer the session automatically as described elsewhere herein (which may also include "state" preservation functions if desired).

In another embodiment, a substantially network-based user interface is employed; see e.g., the exemplary implementation described in co-owned and co-pending U.S. provisional patent application Ser. No. 61/256,903 filed Oct. 30, 2009 previously incorporated herein. In this embodiment, a network entity (e.g., server) is used to manage and update UI's generated on the client devices within the network, including generation of graphics, listings, etc. illustrating different device delivery options as described elsewhere herein. For instance, in one scenario, the user requests delivery of a particular content element via their IP-enabled DSTB and associated monitor. The resulting evaluation of associated user/premises devices produces a recommendation or listing of other devices, which are then displayed on the UI (e.g., in a graphical format, table, etc.), akin to adding another "service".

In yet another embodiment, a speech recognition and command interface of the type well known in the digital signal processing arts is used in conjunction with the aforementioned client device to move sessions from one device to another. This embodiment operates substantially similar to those previously described (e.g., remote control, display, or touch-screen controlled), yet using predetermined commands to effect session transfer. For example, plain language commands such as "Move Transformers to Bedroom" or the like may be employed via the speech interface. In one variant, the speech recognition system can be trained by the user as to particular commands, which may be location- or device-based (e.g., "Move Living Room to Bedroom" or "Move DSTB1 to PC"), or alternatively may be context or content based ("Move [content identifier] to [location] or [device]"), and so forth. The content identifiers selected by the user may in another variant be sent up to the OME or other entity within the network for future access or use; i.e. to allow for encoding of the metadata associated with a particular user session "on the fly" so that the voice command interface will be operative and recognize that particular user's commands. For instance, one user might call the movie "Transformers" by that name, whereas another use might say "movie on HBO" or "movie about transforming robots", and hence prior knowledge by the network of a given user's commands enables the encoding specific to that user. Metadata encoded with content may also or alternatively include several keywords (e.g., "transformer", "robot", "Megan Fox", "HBO", etc.), which may be used by a search function or engine disposed on the client device (or the network entity) to identify the relevant content element. Other commands may also be programmed in; e.g., "Move Transformers to Bedroom in Five Minutes and Shut Down DSTB", or the like.

Voice commands may also be user-specific, such that only a particular user's voice is operative to command session transfer (e.g., via biometrics).

In another variant, speech or another user attribute can be used to determine user presence/movement within a premises. This information can be fed into the client-side application (or even transmitted to the OME) so as to allow for command-prompted or even automatic session transfer within the premises. For example, in one scenario, the user merely says "I am here" when they desire to transfer the session to their new location. The speech recognition engine/command interface receives this input and determines where "here" is (e.g., bedroom, by virtue of the location of the microphone or other device receiving the voice signal), and transfers the session.

Alternatively, a sensor (such as Passive IR or the like, which may even be associated with another host system such as a premises security system) can be used to transfer, initiate, or terminate sessions or other device functions (e.g., power up/down, tuning, etc.). Hence, when a user walks from the living room to the bedroom, the client application and/or OME can receive information regarding the user's location, and move (or replicate) the session automatically. Of course, this type of approach is best suited for a situation where relatively infrequent movement occurs by very few or one individual (e.g., an older person who lives alone and does not move room-to-room very often), although it is not so limited to such applications.

Business Models and "Rules" Engine—

In another aspect of the invention, one or more computer programs running on the processor 406 of the OME 200 (or other entity such as e.g., server 201, BSA hub entity, client device 206, etc.) includes a so-called "rules" engine. This engine comprises, in an exemplary embodiment, one or more software routines adapted to control the operation of the client devices 206 (and optionally supporting network infrastructure) in order to achieve one or more goals relating to operations or business (e.g., profit). Included within these areas are network optimization and reliability goals, increased maintenance intervals, increased subscriber or user satisfaction, increased subscription base, higher revenue or profit (e.g., from increased advertising revenues), more subscriber "views" of given content, higher data download speed, increased bandwidth and responsiveness to changing demands for bandwidth, reduction of undue QAM replication, and so forth.

These rules engine may comprise a separate entity or process, and may also be fully integrated within other processing entities (such as the aforementioned OME), and controlled via e.g., a GUI displayed on a device connected to the relevant device or server. In effect, the rules engine comprises a supervisory entity which monitors and selectively controls the operation of the clients 206 at a higher level, so as to implement desired operational or business rules. The rules engine can be considered an overlay of sorts to the more fundamental algorithms used to accomplish client device recommendations (e.g., the "recommendation engine" discussed above).

For example, the OME 200 or client device 206 may invoke certain operational protocols or decision processes based on information or requests received from the device 206, conditions existing within the network, demographic data, geographic data, user preferences, etc. However, these processes may not always be compatible with higher-level business or operational goals, such as maximizing profit or system reliability. Hence, when imposed, the business/operational rules can be used to dynamically (or manually) control the operation of the client process on the client device 206. The rules may be, e.g., operational or business-oriented in nature, and may also be applied selectively in terms of time of day, duration, specific local areas, or even at the individual user level (e.g., via specific identification of the client device 206 via MAC address, IP address, cryptographic hash or digital signature, or the like, or via user-specific or account-specific login).

For example, one rule implemented by the rules engine may comprise only providing certain types or formats of programming to certain subscribers or classes of subscribers, and/or on certain ones of the subscriber's registered devices. As noted previously, these rules may be implemented at the device level (e.g., client device 206), or at the OME 200 (such as by placing information regarding these rules into the database 250). A particular client device 206 may possess an MPEG-4 decoder, for example, but the device 206 may not be recommended for delivery of requested programs rendered in MPEG-4 encoding, unless the subscriber meets certain criteria (e.g., "premium" subscription, etc.). Similarly, if any of the subscriber's registered devices 206 do not possess a required codec, CA keys, DRM, or network interface, recommendation of the device 206 by the evaluation application 412 may be controlled, and/or the download of the missing component/capability may be restricted to only subscribers meeting certain criteria. As indicated above, in one embodiment, information regarding the subscriber subscription level and other factors affecting content delivery, as well as the rules themselves, may be stored at the database 250 and implemented by the OME 200 (or retrieved by the OME, such as from the network BSS).

Another rule might impose a moratorium or restrictions on upstream data or information messages (e.g., SSP) or requests for content from the client devices 206 during conditions of very heavy loading (e.g., until a certain minimum threshold of available bandwidth is present), thereby avoiding contention for bandwidth resources with "premium" services. Similarly, program-related or other processing typically done upstream of the client devices 206 could be dynamically shifted to the devices 206 under such circumstances so as distribute the processing load (and hence upstream messaging bandwidth consumed) to the client devices 206.

The rules engine may further establish that recommendations by the OME 200 (i.e., recommendation engine previously described) may be limited to only certain subscribers and/or certain types of devices 206. For example, the processes of monitoring, evaluating and notifying (as performed by the monitor application 410, evaluation application 412 and notification application 414) may be limited to only those devices having a premium service level. Additionally, the aforementioned services may be limited to only certain ones of a subscriber's devices 206, the additional devices being added to the service at a premium.

Yet another rule might impose restrictions on establishing or allocating new physical channels/QAMs or IP-packetized delivery sessions to the subscriber channel requests based on device 206 profile data (e.g., the presence or lack of a certain required interfaces, codecs, CA, DRM, etc.). As previously discussed, bandwidth/QAM resource allocation and other relevant network considerations may be used as a basis of determining device 206 recommendations in a broadcast switched network. This process can also be made dynamic if desired; such as where QAM loading and similar parameters can be continuously or periodically re-evaluated, and the operation of the network altered accordingly. For example, when sufficient bandwidth is again present, the subscriber of the previous example may be switched over to a program stream associated with the higher bandwidth codec, or allocated an HD session versus SD on the same HD-capable device (with the switch-over being effectively imperceptible to the subscriber).

Still further, the system may be modified such that during instances of increased demand on the network, certain classes of subscribers (e.g., lower tier subscribers) may only be permitted to view content at particular ones of client devices. In other words, as bandwidth demand increases, certain subscribers may no longer be able to view content on certain devices. As a result, when a requesting device 206 requests content, the subscriber may be restricted as to which devices are available, or in the extreme not be given a choice as to which device to receive the requested content on, but rather will be immediately directed to a device selected by the network. Hence, under this paradigm, the user's available device population/delivery mode "matrix" grows and shrinks as a function of network loading.

The present invention also lends itself to various business models in terms of distribution, operation, and service provision. Specifically, by having remote monitoring, configuration and provisioning capability, the service provider (e.g., MSO) is given greater flexibility in, inter cilia, (i) troubleshooting and repairing faults within the CPE 106 or other connected premises devices which may otherwise require a service visit; and (ii) changing or reconfiguring a given subscriber's service package or capabilities remotely, again obviating a service visit or actions by the subscriber while simultaneously being able to provide requested content at other ones of the subscriber's devices 206. For example, as previously described, new client devices 206 are immediately updated to a subscriber account (as well as removal of devices), then provided to the database 250, thereby allowing the OME 200 to rapidly switch service options on a per-subscriber or per-device basis (enhancing so-called "service velocity").

Under the foregoing model, the MSO may also utilize the OME and supporting processes to mitigate service outages for the subscriber. For instance, in one variant, the device population for a given user or subscriber account is periodically or anecdotally scanned and evaluated for the then "best" alternative or second option for the user, based on e.g., the output of the recommendation engine. At any given time, the subscriber may be utilizing the "best" option, and the rules engine could utilize the recommendation engine to rank the available options to periodically determine the second-best option. Hence, when a device failure or other delivery issue of the (then) "best" option occurs, the OME would be primed to immediately swap the subscriber over to the second-best choice at that time, and display a notification (or generate an audible cue, etc) on the then-selected (alternative) platform (and the failed platform, to the degree it is operable to do so) to alert the user as to the switch and why it occurred (e.g., "Malfunction on Option No. 1—Network-imposed Switched to Option 2", or the like). This approach advantageously maintains subscriber program continuity to the maximum degree possible, rather than having the subscriber staring at a blank of fuzzy screen with no explanation why.

For example, in one implementation, the ROM of each device (e.g., DSTB, gateway, CPD, etc.) might include the aforementioned alert message, so that if it and its associated display are at least marginally functional, the alert could be displayed (rather than having the subscriber have to hunt for which platform was designated "next best" at that moment to find the ongoing program stream).

The foregoing functionality may also be masked by other factors or device considerations, such as sensed availability of alternates at any given time (e.g., only consider then powered-up and registered devices as viable alternatives).

In yet another aspect, the methods and apparatus of the present invention may be tied to additional consideration from the subscriber for changes in service delivery. For example, incremental changes in "service quality" (including e.g., video quality, audio quality, service coverage or reliability, transportability of sessions, access to features (such as e.g., "blended" services such as those described in co-owned and co-pending U.S. provisional patent application Ser. No. 61/256,903 filed Oct. 30, 2009 entitled "METHODS AND APPARATUS FOR PACKETIZED CONTENT DELIVERY OVER A CONTENT DELIVERY NETWORK", incorporated herein by reference in its entirety), access to off-net content, etc.), may be associated with an additional charge. In one variant, an "unlimited" package is offered, wherein the subscriber is given an unlimited number of uses or "upgrades" for an unlimited (within their device capability profile) number of different services, all for an extra monthly premium. Alternatively, a "per use" payment model may be employed, or a finite limit per time period for a given premium. The user may also "barter" for the upgrades in another variant; e.g., such as by exchanging actions (e.g., taking a survey, reviewing a sample advertisement/promotion, etc.) in exchange for the "upgrade(s)" This approach can also be used as a "teaser" for enhancing existing subscriptions; i.e., by offering the subscriber enhanced capabilities for a trial period, they may request an upgrade to their subscription level or addition of the service (for added cost).

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. In a content delivery network comprising at least one content server, a database, and a plurality of client devices, a method for providing content to one or more of said plurality of client devices, said method comprising:
   receiving a request for content from one of said plurality of client devices;
   evaluating whether a subscriber account to which said one client device issuing said request has been registered;
   in response to said evaluation indicating that said one client device issuing said request is not registered to said subscriber account, automatically registering said one client device to said subscriber account;
   identifying at least one other device in said database also registered to said subscriber account; and
   based on said receipt of said request for content from said one of said plurality of client devices, causing generation of a notification for display on said one requesting client device, said notification showing or listing said at least one other device.

2. The method of claim 1, wherein said identifying at least one other device comprises identifying said at least one other device based on its ability to suitably render said requested content.

3. The method of claim 1, wherein said identifying at least one other device comprises identifying said at least one other device based on its ability to suitably render said requested content better than said one client device.

4. The method of claim 1, wherein said identifying at least one other device comprises identifying said at least one other device based on its current availability for display of said requested content.

5. The method of claim 4, wherein said identifying at least one other device comprises further identifying said at least one other device based on its ability to render said requested content better than said one client device.

6. The method of claim 1, wherein said act of registering said client device to a subscriber account comprises:
receiving information identifying said client device and said subscriber account;
associating said client device to said subscriber account; and
storing said association in said database.

7. The method of claim 6, wherein said information identifying said client device comprises at least one of a MAC address and/or an IP address; and
wherein said information identifying said subscriber account comprises at least one of an account number and a login-password combination.

8. The method of claim 6, wherein said act of associating said client device to said subscriber account comprises generating at least one data file or record.

9. The method of claim 1, wherein said determining comprises utilizing a cryptographic hash of a piece of information uniquely identifying said one requesting client device, and matching this to a corresponding hash within said database.

10. The method of claim 1, wherein said notification is further configured to enable a user of said requesting client device to select one or more of said at least one other devices for delivery of content thereto.

11. The method of claim 1, further comprising:
generating a graphical display having representations of at least said one client device and said at least one other device; and
allowing the user to select at least one of the devices via said display.

12. Apparatus for use in a content delivery network, said apparatus comprising:
a network interface configured to communicate with a plurality of network entities;
a storage apparatus; and
a digital processor, said processor in data communication with said interface and said storage apparatus and comprising at least one computer program configured to run thereon, said at least one computer program comprising a plurality of instructions which are configured to, when executed, cause the apparatus to:
monitor content requests from a plurality of user devices, each content request comprising identification information of an individual one of said plurality of user devices;
identify a subscriber account associated with said individual user device;
identify a plurality of additional user devices also associated with said identified subscriber account; and
generate a notification message to send to said individual user device, said notification message comprising a presentation to a user of said individual user device with one or more options for delivery of said requested content to said plurality of identified additional devices, wherein said plurality of identified additional devices are listed in said notification message according to a hierarchy, said hierarchy being determined based on one or more criteria, said criteria comprising at least one of: (i) device capabilities; and/or (ii) one or more user preferences.

13. The apparatus of claim 12, wherein said content delivery network comprises a cable television network having at least one content distribution server configured to service said content requests, said content distribution server being in data communication with said apparatus via said network interface.

14. The apparatus of claim 12, wherein said storage apparatus is in communication with said processor and configured to store a plurality of records which identify a plurality of subscriber accounts and at least one user device associated with each.

15. The apparatus of claim 14, wherein said plurality of records are updated based at least in part on information received from a billing entity of said network.

16. The apparatus of claim 14, wherein said plurality of records are updated based at least in part on information received from said user devices.

17. The apparatus of claim 12, wherein said content requests comprise SIP (Session Initiation Protocol) requests, and said plurality of user devices comprise IP-enabled client devices adapted to support said SIP protocol.

18. The apparatus of claim 12, wherein said one or more criteria comprise one or more user-assigned heuristics regarding device desirability.

19. A method of providing content to a plurality of client devices each registered to a subscriber account, said method comprising:
receiving a request for content from a first one of said plurality of client devices;
determining a subscriber account to which said requesting client device is registered;
identifying a second one of said plurality of client devices also registered to said subscriber account;
providing a protocol translation engine, said engine enabling interoperability between said plurality of client devices and said requesting client device; and
generating a notification for display on said first and said second client devices, said notification enabling a user of said first and said second client devices to select delivery of content at one or more of said first and said second client devices.

20. The method of claim 19, wherein said request comprises at least information uniquely identifying said first client device.

21. The method of claim 20, wherein said information uniquely identifying said client device comprises at least one of an IP address or a MAC address.

22. The method of claim 20, wherein:
said act of determining said subscriber account comprises querying a database using at least said information uniquely identifying said first client device, said database comprising an association of each of said plurality of client devices to a subscriber account; and
said act of identifying said second client device comprises extracting said association from said database.

23. The method of claim 19, wherein said request comprises at least information identifying said subscriber account.

24. The method of claim 23, wherein said information identifying said subscriber account comprises at least one of: (i) an account number, and (ii) a login and password combination.

25. The method of claim 23, wherein said act of determining said subscriber account comprises extracting said information from said request; and
wherein said act of identifying said second client devices comprises querying a database using at least said information identifying said subscriber account, said database comprising an association of each of said plurality of client devices to a subscriber account.

26. The method of claim 19, wherein said notification is configured to enable said user of said first and said second client devices to select delivery of content at only those of said first and said second client devices having one more desired characteristics.

27. The method of claim 19, further comprising:
monitoring and recording user viewing habits; and
recommending one or said first and second client devices based on said user viewing habits in said notification.

28. A non-transitory computer readable apparatus comprising a medium configured to store a computer program for the optimized delivery of content in a network, said computer program comprising a plurality of instructions which are configured to, when executed:
determine an association between a plurality of client devices to a single subscriber account;
obtain content requests, one of said content requests relating to a request for content at a first one of said plurality of client devices;
evaluate one or more aspects of said plurality of client devices, the one or more aspects comprising at least a device bandwidth requirement;
evaluate one or more of a requested content bandwidth requirements or an available bandwidth constraint;
based on said evaluations, select one or more of said plurality client devices which comprises an optimized delivery platform for said requested content; and
present information regarding only said selected one or more client devices to a user of said first client device.

29. The apparatus of claim 28, wherein said computer program is further configured to receive a user selection of at least one of said selected client devices for delivery of said requested content.

30. The apparatus of claim 28, wherein said content requests are forwarded from at least one content distribution server.

31. The apparatus of claim 28, wherein said presentation of information regarding said selected client devices includes said first client device, and comprises a notification or message sent to at least said first client device for display on a display device associated therewith.

32. The apparatus of claim 28, wherein said one or more aspects further comprise at least one of:
device capabilities; and
user preferences.

33. The apparatus of claim 28, wherein said selection of one or more of said plurality client devices, which comprises at least one aspect optimized as a delivery platform comprises selection based at least in part on an ability of said one of said plurality of client devices to provide a higher video picture quality than that available with said first one of said client devices.

34. The apparatus of claim 28, wherein said selection of one or more of said plurality devices, which comprises at least one aspect optimized as a delivery platform for said requested content comprises selection based at least in part on an ability of said one of said plurality of client devices to provide a higher quality audio experience than that available with said first one of said client devices.

35. A headend apparatus for use in a content delivery network comprising at least one content server and a database comprising a plurality of records which associate each of a plurality of user devices to subscriber accounts, said apparatus comprising:
a network interface configured to receive content requests directly or indirectly from said plurality of user devices;
a storage apparatus; and
a digital processor, said processor comprising at least one computer program configure to run thereon, said at least one computer program comprising a plurality of instructions which are configured to, when executed, cause said headend apparatus to:
examine said content requests to identify subscriber accounts associated with each request;
query said database to identify a plurality of user devices associated with a particular one of said subscriber accounts of a particular one of said content requests;
evaluate one or more aspects of said identified plurality of user devices;
based at least in part on said evaluation, select one or more of said plurality of identified user devices as an optimized delivery platform for said requested content; and
present a list of said selected one or more of said plurality of identified user devices to a user, said list being sorted by hierarchy based on said evaluation.

36. The apparatus of claim 35, wherein said one or more aspects of said identified plurality of user devices comprise one or more user-assigned heuristic regarding the desirability of each of said plurality of user devices.

37. The apparatus of claim 35, wherein said plurality of instructions are further configured to, when executed, cause said headend apparatus to determine one or more of bandwidth requirements of said requested content or available bandwidth constraints, said list being sorted by hierarchy being further based on said determination.

38. A method of operating a content delivery apparatus, comprising:
establishing a communication session between a content source and a first recipient device using a session-based protocol adapted for use on a packet-switched network;
identifying a subscriber account associated with said first recipient device;
transferring packetized content to said first recipient device within said session;
determining a second recipient device associated to the subscriber account associated with said first recipient device which comprises at least one characteristic optimized for at least one of receipt, processing, or display of said packetized content;
establishing a communication session between said content source and said second recipient device;
based at least in part on said determination, identifying at least one future time period to switch delivery of said packetized content to said second recipient device; and
switching delivery of said packetized content to said second recipient device during said future time period.

39. The method of claim 38, wherein said content source comprises an IP TV (Internet Protocol television) server disposed within said content delivery network.

40. The method of claim 39, wherein said content delivery network comprises a Hybrid Fiber coaxial (HFC) cable television network, and said packetized content is delivered according to a unicast session over said HFC network via one or more Quadrature Amplitude Modulation (QAM) channels.

41. The method of claim 38, wherein said communication session established between said content source and said first recipient device, and said communication session established between said content source and said second recipient device, comprise said same communication session.

42. The method of claim 38, further comprising:
associating said first recipient device and said second recipient device within a database of a network operator to a same user; and
based at least in part on said association, notifying said user via said first recipient device that said second recipient device is available for receipt of said packetized content.

43. The method of claim 38, wherein said switching delivery of said packetized content to said second recipient device from said first device comprises the following steps, performed substantially and without further user intervention:
suspending display of said packetized content on said first recipient device or a display device associated therewith;
recording, on premises recording device, a portion of said packetized content delivered during said suspension;
resuming said display of said packetized content on said second recipient device or a display device associated therewith during said time period; and
giving a user the option to resume display of said packetized content starting with said recorded portion.

44. The method of claim 38, wherein said switching delivery of said packetized content to said second recipient device from said first device comprises the following steps, performed substantially and without further user intervention:
suspending display of said packetized content on said first recipient device or a display device associated therewith, said suspending comprising suspending delivery of said packetized content to a premises where said first recipient is located; and
resuming said display of said packetized content on said second recipient device or a display device associated therewith during said time period, said resuming comprising resuming delivery of said packetized content substantially at a point within said packetized content where said suspending was invoked.

45. The method of claim 38, wherein said at least one characteristic comprises a minimum bandwidth requirement.

46. The method of claim 38, wherein said at least one characteristic is determined at least in part by rules specified by a user.

* * * * *